(12) United States Patent
Nakashima

(10) Patent No.: US 6,228,804 B1
(45) Date of Patent: May 8, 2001

(54) COLOR-CHANGE MATERIALS

(75) Inventor: Akio Nakashima, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 09/184,077

(22) Filed: Nov. 2, 1998

(30) Foreign Application Priority Data

Oct. 31, 1997 (JP) .................................................. 9-316210
Aug. 31, 1998 (JP) ................................................ 10-262473

(51) Int. Cl.7 ..................................................... B41M 5/20
(52) U.S. Cl. ......................... 503/226; 503/201; 503/206; 503/215
(58) Field of Search .................................. 503/200, 201, 503/206, 208, 209, 226, 215

(56) References Cited

U.S. PATENT DOCUMENTS

| | | | |
|---|---|---|---|
| 4,028,118 | 6/1977 | Nakasuji et al. | 206/21 |
| 4,720,301 | 1/1988 | Kito et al. | 106/21 |
| 4,732,810 | 3/1988 | Kito et al. | 428/402.2 |
| 4,810,562 | 3/1989 | Okawa et al. | 428/199 |
| 4,925,727 | 5/1990 | Brown et al. | 428/199 |
| 5,163,846 | 11/1992 | Lee | 434/408 |
| 5,558,699 | 9/1996 | Nakashima et al. | 106/21 A |
| 5,558,700 | 9/1996 | Shibahashi et al. | 106/21 A |
| 5,972,837 * | 10/1999 | Satoh et al. | 503/209 |

FOREIGN PATENT DOCUMENTS 0 595 577 A2    5/1994  (EP) .
0 665 119 A1    8/1995  (EP) .
50-5097         2/1975  (JP) .

OTHER PUBLICATIONS

Database WPI, Section Ch, Week 9019, Derwent Publications Ltd., London, GB. Abstract No. XP002110362 (JP 02–086659, (Nippon Oil Seal Ind. Co. Ltd.), Mar. 27, 1990).

Database WPI, Section Ch, Week 9635, Derwent Publications Ltd., London, GB. Abstract No. XP002110363 (JP 06–319987 (Rokusaki T), Nov. 22, 1994).

Patent Abstracts of Japan, vol. 014, No. 261, Jun. 6, 1990, (JP 02–074688 A, (Matsumoto Yushi Seiyaku Co., Ltd.) Mar. 14, 1990).

* cited by examiner

*Primary Examiner*—Bruce H. Hess
(74) *Attorney, Agent, or Firm*—Sughrue, Mion, Zinn, Macpeak & Seas, PLLC

(57) ABSTRACT

A color-change material has a reversibly thermochromic layer and a porous layer containing a low-refractive-index pigment. The color-change material changes its color in response to heat or water. The reversibly thermochromic layer and the porous layer are superposed on each other, or the reversibly thermochromic layer and the porous layer are formed side by side. Alternatively, a color-change material has a substrate and formed thereon a color-changing porous layer including a reversibly thermochromic material, a low-refractive-index pigment, and a binder. The reversibly thermochromic material and the pigment are dispersed in the binder and tenaciously adherent thereto.

23 Claims, 5 Drawing Sheets

COLOR-CHANGE MATERIALS

BACKGROUND OF THE INVENTION

1. Field of the Invention

The present invention relates to color-change materials. More particularly, this invention relates to color-change materials whose appearances change from their ordinary ones upon application of heat and/or a medium such as water.

2. Description of the Related Art

Thermochromic articles obtained by processing reversibly thermochromic materials have conventionally been used extensively in the fields of toys, ornaments, etc. On the other hand, converted papers are known which have a porous layer containing a low-refractive-index pigment and which, upon liquid absorption, becomes transparent and develops a colored image not seen in their ordinary state (see, for example, Unexamined Japanese Patent Publication No. Sho. 50-5097).

SUMMARY OF THE INVENTION

It is an object to provide color-change materials which employ a reversibly thermochromic material and a low-refractive-index pigment in combination and produce, due to the combined use of these, a multiple effect not attainable by materials comprising either the reversibly thermochromic material or the pigment, and which are intended to be used in applications in the fields of toys and ornaments.

According to the present invention, a color-change material comprises a reversibly thermochromic layer and a porous layer containing a low-refractive-index pigment; wherein the color-change material changes its color in response to heat or water.

According to the present invention, a color-change material comprises a substrate and formed thereon a color-changing porous layer which comprises a reversibly thermochromic material, a low-refractive-index pigment, and a binder, the reversibly thermochromic material and the pigment being dispersed in the binder and tenaciously adherent thereto.

These color-change materials can effectively exhibit a variety of color changes based on a combination of the function of thermally changing their colors with changing temperature in an ambient-temperature range and the function of changing the degree of transparency between a transparent state and an opaque state upon application of a medium, e.g., water. Since these changes in appearance can be reversibly reproduced repeatedly, the color-change materials can be used in applications in the fields of toys, designs, fashion, ornaments, etc.

DETAILED DESCRIPTION OF THE INVENTION

Figure 1:
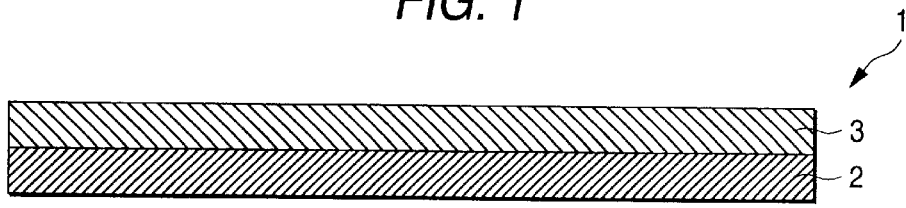
FIG. 1 is a vertical sectional view illustrating one embodiment of the color-change materials of the invention.

Detailed description of the present invention will be described as follows.

The present invention provides a color-change material having a reversibly thermochromic layer and a porous layer containing a low-refractive-index pigment and changes its color in response to heat or water. The features of this invention reside, for example, in that the reversibly thermochromic layer and the porous layer containing a low-refractive-index pigment is superposed on each other; that the reversibly thermochromic layer and the porous layer containing a low-refractive-index pigment are formed side by side; that the color-change material is constituted by a substrate, the reversibly thermochromic layer formed on the substrate, and the porous layer formed on the reversibly thermochromic layer; that the color-change material has a substrate, the reversibly thermochromic layer formed on the substrate, the porous layer formed on the reversibly thermochromic layer, and a reversibly thermochromic image pattern layer formed on the porous layer; that the color-change material has a substrate, the porous layer formed on the substrate, and the reversibly thermochromic layer formed on the porous layer; that the color-change material has a substrate, the porous layer formed on the substrate, the reversibly thermochromic layer formed on the porous layer, and a porous image pattern layer formed on the reversibly thermochromic layer; that the reversibly thermochromic layer and/or the porous layer is an image pattern layer; or the like.

The present invention further provides a color-change material having a substrate and formed thereon a color-changing porous layer which contains a reversibly thermochromic material, a low-refractive-index pigment, and a binder, the reversibly thermochromic material and the pigment being dispersed in the binder and tenaciously adherent thereto. The features of this invention reside, for example, in that the proportion of the reversibly thermochromic material to the low-refractive-index pigment is from 1:9 to 9:1 by weight; and that the proportion of the sum of the reversibly thermochromic material and the low-refractive-index pigment to the binder is from 2:10 to 10:2 by weight. Examples of the reversibly thermochromic material used for forming the reversibly thermochromic layer include reversibly thermochromic materials each containing three ingredients consisting of an electron-donating color-developing organic compound, an electron-accepting compound, and an organic compound medium which reversibly causes the color reaction between the two compounds, and further include liquid crystals, $Ag_2HgI_4$, and $Cu_2HgI_4$.

Specific examples of the reversibly thermochromic materials containing the three ingredients consisting of an electron-donating color-developing organic compound, an electron-accepting compound, and an organic compound medium which reversibly causes the color reaction are given in U.S. Pat. Nos. 4,028,118, 4,732,810, and 5,558,700. This kind of material changes its color at a given temperature (point of color change) and, in the ordinary temperature range, is present only in a specific one of the two states shown respectively before and after the color change. Although the other state is maintained as long as the heat or cold necessary to this state is kept being applied, the material returns, upon removal of the heat or cold, to the state shown in the ordinary temperature range. Namely, this material is of the type which changes its color while showing a small hysteresis width ($\Delta H$) with respect to the temperature-color density relationship with changing temperature.

Also effective are the thermochromic color-memory materials proposed in U.S. Pat. Nos. 4,720,301 and 5,558,699 by the present applicant, which change their colors while showing a wide hysteresis width. Specifically, these thermochromic materials are of the type in which the curve obtained by plotting the change in color density with changing temperature differs considerably in shape between the case in which the temperature is elevated from the lower-temperature side of the color change temperature range and the reverse case in which the temperature is lowered from the higher-temperature side of the color change temperature range. These materials are reversibly thermochromic materials characterized in that they can memorize and retain their state experienced at temperatures not higher than the lower-temperature-side point of color change or not lower than the higher-temperature-side point of color change, after they have returned to the ordinary temperature range between the lower-temperature-side point of color change and the higher-temperature-side point of color change.

Although the above-described reversibly thermochromic material containing the three ingredients consisting of an electron-donating color-developing organic compound, an electron-accepting compound, and an organic compound medium which reversibly causes the color reaction can be effectively used as it is, the material is preferably used after having been microencapsulated. This is because the microencapsulated reversibly thermochromic material can retain the same composition and produce the same effect under various use conditions.

By the microencapsulation, a chemically and physically stable pigment can be constituted. Microcapsules suitable for practical use have a particle diameter of generally from 0.1 to 100 $\mu$m, preferably from 1 to 50 $\mu$m. more preferably from 2 to 30 $\mu$m.

For the microencapsulation, conventionally known techniques may be used, such as, e.g., the interfacial polymerization method, in-situ polymerization method, coating method in which curing is conducted in a liquid, phase separation from an aqueous solution, phase separation from an organic solvent, fusion dispersion cooling method, coating method in which a suspension in air is used, and spray drying method. A suitable method may be selected from these according to uses. Prior to practical use, the microcapsules may be coated with a secondary resin film to impart durability thereto or modify the surface properties thereof.

The reversibly thermochromic material (preferably microcapsules containing the reversibly thermochromic material encapsulated therein) may be used to form a reversibly thermochromic layer by dispersing the material into a vehicle containing a binder serving as a film-forming material to prepare a coloring material, e.g, an ink or coating composition, and applying the coloring material on any of various substrates. It is also possible to use the reversibly thermochromic material to form a substrate which itself has reversibly thermochromic properties by dispersing the reversibly thermochromic material into a thermoplastic resin or thermosetting resin and forming the dispersion into a sheet or any of other various shapes.

The binder is preferably a transparent film-forming resin, examples of which are as follows.

Examples of the binder include ionomer resins, isobutylene/maleic anhydride copolymer resins, acrylonitrile/acrylic styrene copolymer resins, acrylonitrile/styrene copolymer resins, acrylonitrile/butadiene/styrene copolymer resins, acrylonitrile/chlorinated polyethylene/styrene copolymer resins, ethylene/vinyl chloride copolymer resins, ethylene/vinyl acetate copolymer resins, ethylene/vinyl acetate/vinyl chloride graft copolymer resins, vinylidene chloride resins, vinyl chloride resins, chlorinated vinyl chloride resins, vinyl chloride/vinylidene chloride copolymer resins, chlorinated polyethylene resins, chlorinated polypropylene resins, polyamide resins, high-density polyethylene resins, medium-density polyethylene resins, linear low-density polyethylene resins, poly(ethylene terephthalate) resins, poly(butylene terephthalate) resins, polycarbonate resins, polystyrene resins, high-impact polystyrene resins, polypropylene resins, poly(methylstyrene) resins, poly(acrylic ester) resins, poly(methyl methacrylate) resins, epoxy acrylate resins, alkylphenol resins, rosin-modified phenolic resins, rosin-modified alkyd resins, phenol-modified alkyd resins, epoxy-modified alkyd resins, styrene-modified alkyd resins, acrylic-modified alkyd resins, aminoalkyd resins, vinyl chloride/vinyl acetate resins, styrene/butadiene resins, epoxy resins, unsaturated polyester resins, polyurethane resins, vinyl acetate emulsion resins, styrene/butadiene emulsion resins, acrylic ester emulsion resins, water-soluble alkyd resins, water-soluble melamine resins, water-soluble urea resins, water-soluble phenolic resins, water-soluble epoxy resins, water-soluble polybutadiene resins, cellulose acetate, cellulose nitrate, and ethyl cellulose.

The porous layer is a layer containing a tenaciously adherent low-refractive-index pigment dispersed in a binder resin. This layer in a dry state hides the underlying layer, and becomes transparent or translucent upon absorption of a liquid medium, e.g., water, to make the underlying layer perceptible. When the wet part of the porous layer dries, it returns to the original state.

In the case where the porous layer contains a colorant, the dry layer is in a colored opaque state and hides the underlying layer. Upon absorption of a liquid medium, e.g., water, this porous layer comes into a colored transparent or colored translucent state to make the underlying layer perceptible. When the wet part of this porous layer dries, it returns to the original state.

Examples of the low-refractive-index pigment include finely particulate silicic acids, a barite powder, precipitated barium sulfate, barium carbonate, precipitated calcium carbonate, gypsum, clay, talc, alumina white, and basic magnesium carbonate. These pigments have refractive indexes in the range of from 1.4 to 1.7 and show satisfactory transparency after water absorption. In the present invention the refractive index of the pigment is preferably in the range of 1.4 to 1.7 as described above. If it is less than 1.4, the pigment has transparency so that it is difficult to hide a lower layer in a dry state. If it is more than 1.7, the color-change material does not have transparency even if it absorbs water.

Although the particle diameter of the low-refractive-index pigment is not particularly limited, it is preferably from 0.03 to 10.0 $\mu$m.

Two or more low-refractive-index pigments may be used in combination.

Preferred low-refractive-index pigments include finely particulate silicic acids. Finely particulate silicic acids are produced as noncrystalline amorphous silicic acid, and are roughly classified by production process into two groups: the silicic acid produced by the dry process based on a vapor-phase reaction such as the pyrolysis of a silicon halide, e.g., silicon tetrachloride (hereinafter referred to as "dry-process finely particulate silicic acid"); and that produced by the wet process based on a liquid-phase reaction such as the decomposition of, e.g., sodium silicate with an acid (hereinafter referred to as "wet-process finely particulate silicic acid"). Although both types can be used, wet-process finely particulate silicic acid is more preferred. This is because systems containing wet-process finely particulate silicic acid have higher hiding properties in the ordinary state than systems containing dry-process finely particulate silicic acid. Consequently, use of the wet-process silicic acid can heighten the proportion of a binder resin to finely particulate silicic acid to thereby improve the film strength of the porous layer.

Figure 17:
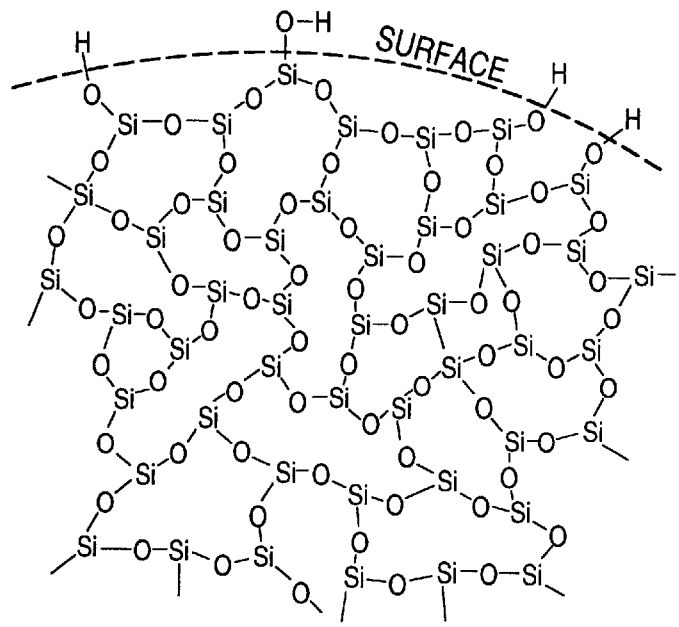
FIG. 17 is a schematic view showing a three-dimensional structure of a dry-process finely particulate silicic acid.

As stated above, the finely particulate silicic acid used for enabling the porous layer to show satisfactory hiding properties in the ordinary state is preferably wet-process finely particulate silicic acid. The reasons for this preference of wet-process silicic acid are as follows. Dry-process finely particulate silicic acid differs in structure from wet-process finely particulate silicic acid. Specifically, dry-process finely particulate silicic acid has a three-dimensional structure constituted of densely linked silicic acid molecules as shown in FIG. 17.

Figure 18:
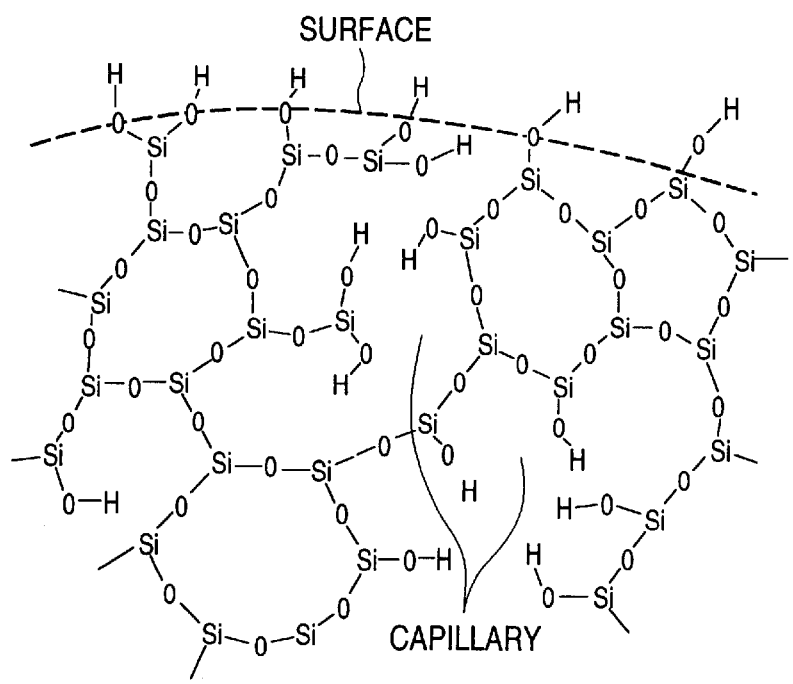
FIG. 18 is a schematic view showing a two-dimensional structure of a wet-process finely particulate silicic acid.

On the other hand, wet-process finely particulate silicic acid has two-dimensional structure parts each constituted of a long arrangement of molecular units formed by the condensation of silicic acid, as shown in FIG. 18. The molecular structure of wet-process finely particulate silicic acid is hence coarser than that of dry-process finely particulate silicic acid. It is therefore presumed that a porous layer containing wet-process finely particulate silicic acid is excellent in irregular light reflection in a dry state and hence has enhanced hiding properties in the ordinary state, as compared with a system containing dry-process finely particulate silicic acid.

The low-refractive-index pigment contained in the porous layer desirably has moderate hydrophilicity because the medium which penetrates into the layer is mainly water. In this point, wet-process finely particulate silicic acid is preferred because it has a larger amount of hydroxyl groups present as silanol groups on the particle surface and is hence more hydrophilic than dry-process finely particulate silicic acid.

In the case of using wet-process finely particulate silicic acid as a low-refractive-index pigment, the application amount thereof is preferably from 1 to 30 g/m$^2$, more preferably from 5 to 20 g/m$^2$, from the standpoint of satisfying both hiding properties in the ordinary state and transparency after water absorption, although it varies depending on the properties of the wet-process finely particulate silicic acid, e.g., the kind, particle diameter, specific surface area, and oil absorption thereof. If the amount thereof is smaller than 1 g/m$^2$, it is difficult to obtain sufficient hiding properties in the ordinary state. If the amount thereof exceeds 30 g/m$^2$, it is difficult to obtain sufficient transparency after water absorption.

The low-refractive-index pigment is dispersed into a vehicle containing a binder resin, and the dispersion is applied and then dried to remove the volatile ingredient to thereby form a porous layer.

Examples of the binder resin include urethane resins, nylon resins, vinyl acetate resins, acrylic ester resins, acrylic ester copolymer resins, acrylic polyol resins, vinyl chloride/vinyl acetate copolymer resins, maleic acid resins, polyester resins, styrene resins, styrene copolymer resins, polyethylene resins, polycarbonate resins, epoxy resins, styrene/butadiene copolymer resins, acrylonitrile/butadiene copolymer resins, methyl methacrylate/butadiene copolymer resins, butadiene resins, chloroprene resins, melamine resins, carboxylated SBR resins, carboxylated NBR resins, emulsions of the resins enumerated above, casein, starch, cellulose derivatives, poly(vinyl alcohol), urea resins, phenolic resins, and epoxy resins.

As compared with conventionally known general coating films, the porous layer described above has a smaller binder resin proportion to the pigment and is hence less apt to have sufficient film strength. Consequently, for use in applications where washing resistance and abrasion resistance are required, it is preferred to use a urethane resin or nylon resin as the binder resin or as part of the binder resin.

Examples of the urethane resin include polyester urethane resins, polycarbonate urethane resins, and polyether urethane resins. A combination of two or more of such urethane resins may be used. It is also possible to use either a urethane emulsion resin which is an aqueous emulsion of any of the above resins or a colloidal dispersion type (ionomer type) urethan resin obtained by causing a urethane resin having ionicity (urethane ionomer) to dissolve or disperse in water by means of self-emulsification based on its ionic groups without the aid of an emulsifying agent.

The urethane resin may be either a water-compatible one or an oil-compatible one. However, a water-compatible urethane resin, in particular, a urethane emulsion resin or colloidal dispersion type urethane resin, is preferably used.

Although the urethane resin can be used alone, it may be used in combination with one or more other binder resins according to the kind of the substrate and the performances required of the film. In the case where a combination of the urethane resin with other resin(s) is used, the content of the urethane resin is preferably regulated to at least 30% by weight on solid basis based on all binder resin in the porous layer in order to obtain film strength sufficient for practical use.

When a crosslinkable binder resin is used, the film strength can be further improved by adding any desired crosslinking agent to crosslink the resin.

The binder resins enumerated above vary in affinity for media. By using a suitable combination of two or more of these, it is possible to regulate the time required for a medium to penetrate into the porous layer, the degree of penetration, and the rate of drying after penetration. It is also possible to control the penetration time, degree of penetration, and rate of drying after penetration by suitably adding a dispersant.

According to the present invention, a color-changing porous layer which has a reversibly thermochromic material, a low-refractive-index pigment, and a binder and in which the reversibly thermochromic material and the pigment are dispersed in the binder and tenaciously adherent thereto may be formed on a substrate.

In the color-changing porous layer, the proportion of the reversibly thermochromic material to the low-refractive-index pigment is preferably from 1:9 to 9:1 by weight.

The above proportion range is necessary for satisfying both the color change with changing temperature of the reversibly thermochromic material and the functions of the low-refractive-index pigment, i.e., the hiding properties in a dry state and transparency after water application. That proportion is preferably from 2:8 to 8:2.

If the proportion of the reversibly thermochromic material is too low and that of the low-refractive-index pigment is too high, the color-changing porous layer shows poor transparency after application of water, although excellent in hiding properties in a dry state due to the low-refractive-index pigment. In addition, the reversibly thermochromic material in its colored state has an insufficient color density. This color-changing porous layer therefore shows an unclear color change and does not satisfy properties required for practical use.

On the other hand, if the proportion of the reversibly thermochromic material is too high and that of the low-refractive-index pigment is too low, not only the color-changing porous layer in its decolored state has a residual color due to the thermochromic material, but also the layer shows poor hiding properties in a dry state due to the low-refractive-index pigment. This color-changing porous layer therefore shows an unclear color change and does not satisfy properties required for practical use.

Also in the case of using a microcapsule pigment containing the reversibly thermochromic material encapsulated therein, the proportion by weight of the material is preferably the same as the above.

In the color-changing porous layer, the proportion of the sum of the reversibly thermochromic material and the low-refractive-index pigment to the binder is preferably from 2:10 to 10:2.

The above proportion range is necessary for satisfying not only the functions of the reversibly thermochromic material combined with the low-refractive-index pigment, i.e., the color change with changing temperature, hiding properties in a dry state, and transparency after water application, but also the durability of the film. That proportion is preferably from 3:10 to 10:3.

If the proportion of the sum of the reversibly thermochromic material and the low-refractive-index pigment is too low and that of the binder is too high, the color-changing porous layer is less apt to show a desired appearance change with a temperature change or upon water application.

On the other hand, if the proportion of the sum of the reversibly thermochromic material and the low-refractive-index pigment is too high and that of the binder is too low, the film has poor durability.

Also in the case of using a microcapsule pigment containing the reversibly thermochromic material encapsuled therein, the proportion by weight of the sum of the reversibly thermochromic material and the pigment is preferably the same as the above.

Examples of the substrate include cloths such as woven fabrics, knit fabrics, braiding, and nonwoven fabrics, papers, synthetic papers, flocked fabrics, raised fabrics, artificial leathers, leathers, plastics, glasses, ceramics, woods, and stones. All of these are effective.

When a constitution according to the present invention having a reversibly thermochromic layer which itself serves as a substrate and a porous layer formed on the reversibly thermochromic layer is brought into contact with a medium, e.g., water, having a temperature in the range where the reversibly thermochromic layer does not undergo a color change, then the medium penetrates into the porous layer to make this layer transparent, whereby the color of the underlying reversibly thermochromic layer is perceived.

On the other hand, when the above constitution is brought into contact with a medium, e.g., water, having a temperature in the range where the reversibly thermochromic layer undergoes a color change, then the medium penetrates into the porous layer to make this layer transparent and to change the color of the underlying reversibly thermochromic layer.

An example of the above constitution is a color-change material having a reversibly thermochromic layer which changes its color in response to the body temperature. This color-change material can be used in such a manner that it is brought into contact with a medium, e.g., water, having a temperature in the range where the reversibly thermochromic layer does not undergo a color change to thereby make the porous layer transparent, and the color of the reversibly thermochromic layer is then changed by a hand touch. This color-change material can be made to show a wider variety of color changes, for example, by using these layers in combination with a non-color-changing layer.

The reversibly thermochromic layer in each of the constitutions described above may undergo either of a reversible color change between colored state and colorless state and a reversible color change between colored state (1)←→colored state (2).

In order for a constitution of the color-change material of the present invention to have appearances of three or more different color tones, the layer(s) underlying the porous layer should have two or more color tones different from the color tone of the porous layer in a dry state. In order for appearances of such two or more different color tones to be perceived, the reversibly thermochromic layer itself should have such different color tones. Alternatively, in the case where the reversibly thermochromic layer is a layer which reversibly changes its color from a colored state to a colorless state, a substrate or a colored layer each having a color tone different from that color tone should be disposed.

Since the porous layer contains a low-refractive-index pigment such as silica, it in a dry state shows high hiding properties to completely hide the color tone of the underlying layer. Consequently, even when the underlying layer has a dark color, the color-change material can be constituted so that a relatively light color tone is perceived.

Furthermore, a reversibly thermochromic image pattern layer consisting of a reversibly thermochromic layer may be formed on the porous layer to obtain a wider variety of design changes.

The system having a substrate, a porous layer formed thereon, and a reversibly thermochromic layer formed on the porous layer is explained next. From the standpoint of enabling a medium, e.g., water, to penetrate into the porous layer, the overlying reversibly thermochromic layer also is preferably permeable to the medium, e.g., water.

When the color-change material has a reversibly thermochromic layer which reversibly changes its color from a colored state to a colorless state and is in the colored state at the ambient temperature and this color-change material is brought into contact with a medium, e.g., water, having a temperature in the range where the composition undergoes a color change, then the reversibly thermochromic layer is decolored and, at the same time, the porous layer becomes transparent. As a result, the color tone of the substrate is perceived.

When the color-change material is heated or cooled, without being brought into contact with a medium, e.g., water, for example, by a hand touch or by blowing warm air, cold air, etc., then the reversibly thermochromic layer is decolored and the color tone of the porous layer is perceived.

Furthermore, when the color-change material has a reversibly thermochromic layer which reversibly changes its color from a colored state to a colorless state and is in the decolored state at the ambient temperature and this color-change material is brought into contact with a medium, e.g., water, having a temperature in the range where the reversibly thermochromic layer does not undergo a color change, then the porous. layer becomes transparent and the color tone of the substrate is perceived. When this color-change material is brought into contact with a medium having a temperature in the range where the reversibly thermochromic layer undergoes a color change, then the thermochromic layer in its colored state is perceived.

In each of the above constitutions, the reversibly thermochromic layer is preferably one which reversibly changes its color from a colored state to a colorless state. In order for each of these constitutions to have appearances of three or more different color tones, the layer(s) underlying the reversibly thermochromic layer should have two or more color tones different from the color tone of the reversibly thermochromic layer. In order for such two or more different color tones to be perceived, it is necessary that the substrate and the dry-state porous layer should have different colors or that a colored layer having a color tone different from that of the porous layer in a dry state should be interposed between the porous layer and the substrate.

Since the porous layer contains a low-refractive-index pigment such as silica, it in a dry state shows high hiding properties to completely hide the color tone of the underlying layer. The overlying reversibly thermochromic layer can have a light color tone.

Furthermore, a porous image pattern layer having a porous layer may be formed on the reversibly thermochromic layer to obtain a wider variety of design changes.

Although the structures described above in which the reversibly thermochromic layer and the porous layer have been superposed on each other are most effective in exhibiting a variety of color changes, a structure in which the reversibly thermochromic layer and the porous layer are not in a stacked state is also effective.

In particular, a color-change material in which the two layers are disposed close to each other can be caused to undergo a color change by means of either heat or water.

Thus, a wider variety of coloring means combined with the resultant increase in the number of colors heighten the suitability of the color-change material for use in toys and the effect thereof on attractive appearance.

The system having a substrate and formed thereon a color-changing porous layer which contains a reversibly thermochromic material, a low-refractive-index pigment, and a binder and in which the reversibly thermochromic material and the pigment are dispersed in and tenaciously adherent to the binder is further explained next. This color-change material, having the color-changing porous layer formed on a substrate from a color-changing composition containing a reversibly thermochromic material and a low-refractive-index pigment, functions in the following manners. When the color-change material contains a reversibly thermochromic material which reversibly changes its color from a colored state to a colorless state and is in the colored state at the ambient temperature and this color-change material is brought into contact with a medium having a temperature in the range where the color-changing material undergoes a color change, then the color tone of the substrate is perceived.

When this color-change material is heated or cooled, without being brought into contact with a medium, for example, by a hand touch or by blowing warm air, cold air, etc., then the reversibly thermochromic composition is decolored and the color tone of the low-refractive-index pigment is perceived.

Furthermore, when the color-change material has a reversibly thermochromic material which reversibly changes its color from a colored state to a colorless state and is in the decolored state at the ambient temperature and this color-change material is brought into contact with a medium having a temperature in the range where the reversibly thermochromic material does not undergo a color change, then the color tone of the substrate is perceived. When this color-change material is brought into contact with a medium having a temperature in the range where the reversibly thermochromic material undergoes a color change, then either the color tone of the reversibly thermochromic material in its colored state or a mixed color composed of the color tone of the reversibly thermochromic material in its colored state and the color tone of the substrate is perceived.

In each of the above constitutions, the reversibly thermochromic material is preferably one which reversibly changes its color from a colored state to a colorless state.

Since the color-changing porous layer contains a low refractive-index pigment, it in a dry state can completely hide the color tone of the underlying layer. Consequently, even when the underlying layer has a dark color, the color-change material can have a light color.

By using the thermochromic color-memory material described hereinabove as a reversibly thermochromic material, a color-change material showing more complicated and colorful appearances can be obtained because color tones can be retained regardless of changing ambient temperature.

If desired and necessary, colorants may be incorporated into the reversibly thermochromic layer, the porous layer, and the color-changing porous layer to enable the color-change materials of the present invention to show a wider variety of color tones. Examples of the colorants include general color dyes and pigments and fluorescent dyes and pigments. It is also possible, if desired, to use a metalescent pigment or the like such as, e.g., mica coated with titanium dioxide, mica coated with iron oxide/titanium dioxide, mica coated with iron oxide, guanine, sericite, basic lead carbonate, acid lead arsenate, or bismuth oxychloride.

If desired and necessary, a non-color-changing ink containing a general dye or pigment or containing a fluorescent dye or pigment may be applied to form a non-color-changing layer. Furthermore, an ink containing the metalescent pigment may be applied to form a metalescent layer.

In particular, the formation of a non-color-changing layer on a substrate is effective in widening the degree of freedom of changes in color and appearance.

The reversibly thermochromic layer, porous layer, and color-changing porous layer described above each may be an image pattern layer bearing characters, symbols, figures, etc., according to need.

A protective layer or a light stabilizer layer may be suitably formed. Specifically, the light stabilizer layer is a layer containing, dispersed and tenaciously adherent therein, a light stabilizer selected from ultraviolet absorbers, antioxidants, aging inhibitors, singlet oxygen quenchers, superoxide anion quenchers, ozone quencher, visible ray absorbers, and infrared absorbers.

An antistatic agent, polarity-imparting agent, thixotropic agent, antifoamer, etc. may be added, according to need, to the reversibly thermochromic layer or the porous layer to improve functions.

The reversibly thermochromic layer, porous layer, and color-changing porous layer described above can be formed by conventionally known methods such as, e.g., printing techniques including screen printing, offset printing, gravure printing, printing with a coater or tampon, and transfer printing and coating techniques including brushing, spray coating, electrostatic coating, electrodeposition, flow coating, roller coating, and dip coating.

The color-change materials of the present invention are effective in a variety of forms including linear shapes, rugged shapes, and three-dimensional shapes, as well as flat shapes.

Specific examples of embodiments of the color-change materials include stuffed toy animals, dolls, doll clothes such as raincoats, doll accessories such as umbrellas and bags, toys such as water pistol targets, models of motor vehicles or ships, and boards on which traces appear, such as, e.g., the handprint or footprint of a man or doll, training materials or stationary such as papers or sheets for writing with water, clothes such as dresses, swimsuits, and raincoats, footwear such as rain boots, prints such as waterproof books and calendars, amusement goods such as stamp cards, puzzles, and various games, swimming or diving goods such as wetsuits, tubes, and float boards, kitchen goods such as coasters and cups, and other articles including umbrellas, artificial flowers, and winning lottery tickets.

The color-change materials can be applied also to various indicators, for example, for the liquid leakage detection for pipings, water tanks, and other tanks, the detection of wetting by water for the transportation of water-prohibitive chemicals or in storage places therefor, the detection of dew condensation, rainfall, etc., urine detection in disposable diapers, the detection of liquid level or water depth in various containers and pools, and the detection of water in soils.

EXAMPLES

Examples are given below. All parts in the Examples are by weight. Example 1 (see FIG. 1 )

Twenty parts of a microcapsular pigment containing a thermochromic color-memory material encapsulated therein (blue ←→colorless; blue at 15° C. and lower, colorless at 30° C. and higher) was homogeneously mixed with 1 part of a fluorescent pink pigment [trade name, Epocolor FP-10; manufactured by Nippon Shokubai Kogyo Co., Ltd.], 2 parts of a benzotriazole ultraviolet absorber, and 1,000 parts of polypropylene having a Vicat softening point of 100° C. This mixture was treated with an extruder to obtain reversibly thermochromic pellets. These pellets were injection-molded into a sheet to obtain a reversibly thermochromic layer 2.

The reversibly thermochromic layer 2 assumed violet color upon cooling to 15° C. or lower, and this color was maintained in a temperature range below 30° C. The layer 2 assumed pink color upon heating to 30° C. or higher, and this color was maintained in a temperature range above 15° C.

Subsequently, a white screen printing ink prepared by stirring and homogenizing a mixture of 15 parts of a fine silica powder [trade name, Nipsil E-200; manufactured by Nippon Silica Industrial Co., Ltd.], 30 parts of an acrylic ester emulsion (solid content, 50%), 50 parts of water, 0.5 parts of a silicone antifoamer, 3 parts of a thickener for water-based inks, 1 part of ethylene glycol, and 3 parts of a blocked isocyanate crosslinking agent was used to conduct solid printing on the whole surface of the reversibly thermochromic layer 2 through a 180-mesh screen stencil. The ink applied was dried and cured at 130° C. for 5 minutes to form a porous layer 3, which was white in a dry state. Thus, a color-change material 1 having a stacked structure was obtained.

The appearance of the porous layer 3 changed from a white state to a colorless and transparent state upon contact with water or an aqueous medium.

The color-change material 1 was white in a dry state at 24° C. and remained white even when cooled or heated. However, upon contact with cold water having a temperature of 15° C. or lower, the porous layer 3 became transparent and the color of the color-change material 1 instantaneously changed to the violet color attributable to the underlying reversibly thermochromic layer 2. This violet color-change material 1 was allowed to stand at 24° C. As a result, the color-change material 1, which was violet in the wet state, gradually changed its color from violet to white with water vaporization, and recovered the original white color upon completion of drying.

Subsequently, the color-change material 1 was brought into contact with warm water having a temperature of 30° C. or higher. As a result, the porous layer 3 became transparent due to the adherent water and the color of the reversibly thermochromic layer 2 changed from purple to fluorescent-pink. Thus, the color-change material 1 assumed fluorescent pink color.

This violet color-change material 1 was allowed to stand at 24° C. As a result, the color-change material 1, which was fluorescent-pink in the wet state, gradually changed its color from fluorescent-pink to white with water vaporization, and recovered the original white color upon completion of drying.

Thereafter, the dry color-change material 1 was brought into contact with cold water having a temperature of 15° C. or lower to change its color to violet, and part of this violet color-change material 1 was brought into contact with warm water having a temperature of 30° C. or higher. As a result, the color of that part changed from violet to pink, and the color-change material 1 thus came to have a violet area and a pink area. This two-color state was maintained until the water vaporized off to dryness.

As demonstrated above, the color-change material 1 changed its appearance from a wholly white state to violet or fluorescent-pink color upon application of cold or warm water, and recovered the original white state upon drying. Namely, the color-change material 1 could undergo a variety of changes in appearance.

These changes in appearance could be reproduced repeatedly.

Figure 2:
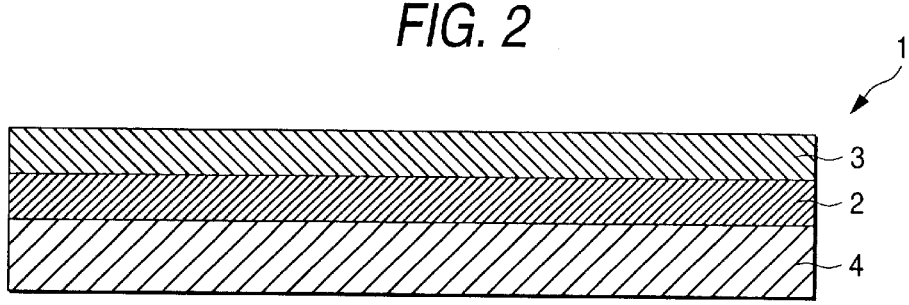
FIG. 2 is a vertical sectional view illustrating another embodiment of the color-change materials of the invention.

Example 2 (see FIG. 2)

A reversibly thermochromic screen printing ink prepared by stirring and homogenizing a mixture of 10 parts of a microcapsular pigment containing a thermochromic color-memory material encapsulated therein (blue←→colorless; blue at 15° C. and lower, colorless at 30° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to conduct solid printing through a 109-mesh screen stencil on the whole surface of a pink nylon taffeta as a substrate 4. The ink applied was dried and cured at 130° C. for 5 minutes to form a reversibly thermochromic layer 2.

Upon cooling to 15° C. or lower, the resultant stacked structure composed of the substrate 4 and the reversibly thermochromic layer 2 assumed purple color resulting from the mixing of the pink of the substrate 4 and the blue of the reversibly thermochromic layer 2. This color tone was maintained in a temperature range below 30° C. Upon heating to 30° C. or higher, the reversibly thermochromic layer 2 became colorless and the pink color of the substrate 4 was perceived.

This color tone was maintained in a temperature range above 15° C.

Subsequently, a white screen printing ink prepared by stirring and homogenizing a mixture of 15 parts of a fine silica powder [trade name, Nipsil E-200; manufactured by Nippon Silica Industrial Co., Ltd.], 30 parts of an acrylic ester emulsion (solid content, 50%), 50 parts of water, 0.5 parts of a silicone antifoamer, 3 parts of a thickener for water-based inks, 1 part of ethylene glycol, and 3 parts of a blocked isocyanate crosslinking agent was used to conduct solid printing on the whole surface of the reversibly thermochromic layer 2 through a 180-mesh screen stencil. The ink applied was dried and cured at 130° C. for 5 minutes to form a porous layer 3, which was white in a dry state. Thus, a color-change material 1 was obtained.

The appearance of the porous layer 3 changed from a white state to a colorless and transparent state upon contact with water or a water-soluble liquid.

The color-change material 1 was white in a dry state at 24° C. and remained white even when cooled or heated. However, upon contact with cold water having a temperature of 15° C. or lower, the porous layer 3 became transparent due to the adherent water and the color of the color-change material 1 instantaneously changed to purple color resulting from the mixing of the colors of the underlying reversibly thermochromic layer 2 and substrate 4. This purple color-change material 1 was allowed to stand at 24° C. As a result, the color-change material 1, which was purple in the wet state, gradually changed its color from purple to white with water vaporization, and recovered the original white color upon completion of drying.

Subsequently, the color-change material 1 was brought into contact with warm water having a temperature of 30° C. or higher. As a result, the porous layer 3 became transparent due to the adherent water and the color of the reversibly thermochromic layer 2 changed from blue to colorless. Thus, the color-change material 1 assumed the pink color attributable to the substrate 4.

This pink color-change material 1 was allowed to stand at 24° C. As a result, the color-change material 1, which was pink in the wet state, gradually changed its color from pink to white with water vaporization, and recovered the original white color upon completion of drying.

Thereafter, the dry color-change material was brought into contact with cold water having a temperature of 15° C. or lower to change its color to purple, and part of this purple color-change material was brought into contact with warm water having a temperature of 30° C. or higher. As a result, the color of that part changed from purple to pink, and the color-change material thus came to have a purple area and a pink area. This two-color state was maintained until the water vaporized off to dryness.

As demonstrated above, the color-change material 1 changed its appearance from a wholly white state to purple or pink color upon application of cold or warm water, and recovered the original white state upon drying. Namely, the color-change material 1 could undergo a variety of changes in appearance.

These changes in appearance could be reproduced repeatedly.

Figure 3:
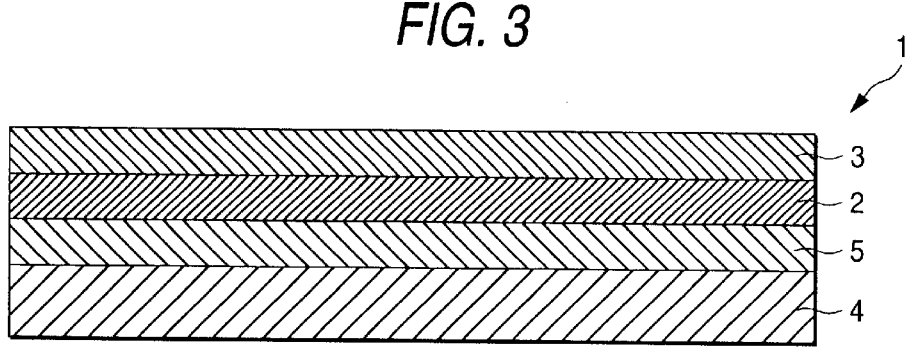
FIG. 3 is a vertical sectional view illustrating still another embodiment of the color-change materials of the invention.

Example 3 (see FIG. 3)

A fluorescent yellow screen printing ink prepared by stirring and homogenizing a mixture of 10 parts of a yellow fluorescent pigment [trade name, Epocolor FP-117; manufactured by Nippon Shokubai Kagaku Kogyo Co., Ltd.], 50 parts of an acrylic ester emulsion (solid content, 50%), 0.2 parts of a silicone antifoamer, 5 parts of a thickener, 1 part of a leveling agent, 10 parts of water, and 2.5 parts of an epoxy crosslinking agent was used to conduct solid printing through a 150-mesh screen stencil on the whole surface of a white nylon taffeta as a substrate 4. The ink applied was dried and cured at 130° C. for 5 minutes to form a non-color-changing layer 5. A reversibly thermochromic screen printing ink prepared by stirring and homogenizing a mixture of 10 parts of a microcapsular pigment containing a thermochromic color-memory material encapsulated therein (blue←→colorless; blue at 15° C. and lower, colorless at 30° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to conduct solid printing through a 109-mesh screen stencil on the whole upper surface of the non-color-changing layer 5. The ink applied was dried and cured at 130° C. for 5 minutes to form a reversibly thermochromic layer 2.

Upon cooling to 15° C. or lower, the resultant stacked structure having the non-color-changing layer 5 and the reversibly thermochromic layer 2 assumed green color resulting from the mixing of the fluorescent yellow of the non-color-changing layer 5 and the blue of the reversibly thermochromic layer 2. This color tone was maintained in a temperature range below 30° C. Upon heating to 30° C. or higher, the reversibly thermochromic layer 2 became colorless and the fluorescent yellow color of the non-color-changing layer 5 was perceived. This color tone was maintained in a temperature range above 15° C.

The white screen printing ink prepared in Example 1 was used to conduct solid printing on the whole upper surface of the reversibly thermochromic layer 2, and the ink applied was dried and cured to form a porous layer 3. Thus, a color-change material 1 was obtained.

The appearance of the porous layer 3 changed from a white state to a colorless and transparent state upon contact with water or a water-soluble liquid.

The color-change material 1 was white in a dry state at 24° C. and remained white even when cooled or heated. However, upon contact with cold water having a temperature of 15° C. or lower, the porous layer 3 became transparent and the color of the color-change material 1 instantaneously changed to green color resulting from the mixing of the colors of the underlying reversibly thermochromic layer 2 and non-color-changing layer 5. This green color-change material 1 was allowed to stand at 24° C. As a result, the color-change material 1, which was green in the wet state, gradually changed its color from green to white with water vaporization, and recovered the original white color upon completion of drying.

Subsequently, the color-change material 1 was brought into contact with warm water having a temperature of 30° C. or higher. As a result, the porous layer 3 became transparent and the color of the reversibly thermochromic layer 2 changed from blue to colorless. Thus, the color-change material 1 assumed the fluorescent yellow color attributable to the non-color-changing layer 5.

This fluorescent-yellow color-change material 1 was allowed to stand at 24° C. As a result, the color-change material 1, which was fluorescent-yellow in the wet state, gradually changed its color from fluorescent-yellow to white with water vaporization, and recovered the original white color upon completion of drying.

Thereafter, the dry color-change material was brought into contact with cold water having a temperature of 15° C. or lower to change its color to green, and part of this green color-change material 1 was brought into contact with warm water having a temperature of 30° C. or higher. As a result, the color of that part changed from green to yellow, and the color-change material 1 thus came to have a green area and a yellow area. This two-color state was maintained until the water vaporized off to dryness.

As demonstrated above, the color-change material 1 changed its appearance from a wholly white state to green or fluorescent-yellow upon application of cold or warm water, and recovered the original white state upon drying. Namely, the color-change material 1 could undergo a variety of changes in appearance.

These changes in appearance could be reproduced repeatedly.

Figure 4:
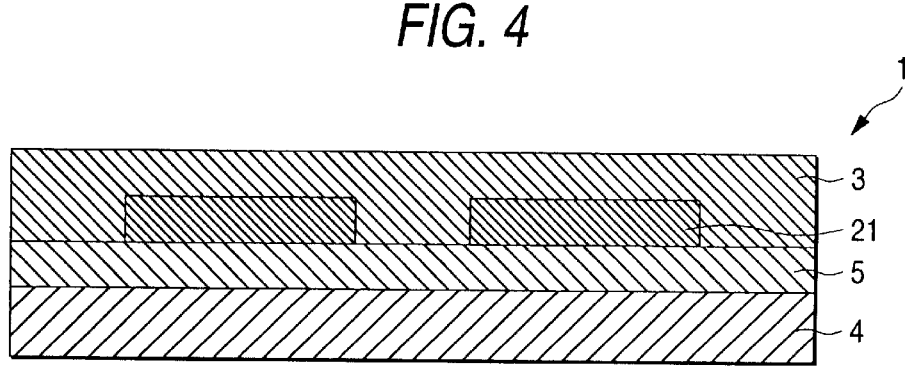
FIG. 4 is a vertical sectional view illustrating a further embodiment of the color-change materials of the invention.

Example 4 (see FIG. 4)

A fluorescent yellow screen printing ink prepared by stirring and homogenizing a mixture of 10 parts of a yellow fluorescent pigment [trade name, Epocolor FP-117; manufactured by Nippon Shokubai Kagaku Kogyo Co., Ltd.], 50 parts of an acrylic ester emulsion (solid content, 50%), 0.2 parts of a silicone antifoamer, 5 parts of a thickener, 1 part of a leveling agent, 10 parts of water, and 2.5 parts of an epoxy crosslinking agent was used to conduct solid printing through a 150-mesh screen stencil on the whole surface of a white polyester satin as a substrate 4. The ink applied was dried and cured at 130° C. for 5 minutes to form a non-color-changing layer 5. A reversibly thermochromic screen printing ink prepared by stirring and homogenizing a mixture of 10 parts of a microcapsular pigment containing a reversibly thermochromic material encapsulated therein (blue Ad colorless; blue below 15° C., colorless at 15° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to print a flower pattern through a 109-mesh screen stencil on the upper surface of the non-color-changing layer 5. The ink applied was dried and cured at 130° C. for 5 minutes to form a reversibly thermochromic image pattern layer 21.

The resultant stacked structure having the non-color-changing layer 5 and the reversibly thermochromic image pattern layer 21 was wholly fluorescent-yellow at 24° C. due to the non-color-changing layer 5. Upon cooling to 15° C. or lower, the reversibly thermochromic image pattern layer 21 assumed blue color, and a green flower pattern on a yellow background was perceived. When the stacked structure warmed up and returned to a temperature above 15° C., the reversibly thermochromic image pattern layer 21 was decolored and the stacked structure wholly turned fluorescent-yellow.

The white screen printing ink prepared in Example 1 was used to conduct solid printing on the whole upper surface of the reversibly thermochromic image pattern layer 21, and the ink applied was dried and cured to form a porous layer 3. Thus, a color-change material 1 was obtained.

The appearance of the porous layer 3 changed from a white state to a colorless and transparent state upon contact with water or a water-soluble liquid.

The color-change material 1 was white in a dry state at 24° C. and remained white even when cooled or heated. However, upon contact with water having a temperature of 15° C. or higher, the porous layer 3 became transparent and the color-change material 1 hence wholly assumed yellow color. This color-change material 1 was allowed to stand at 24° C. As a result, the color-change material 1 dried with water vaporization and returned to the white color.

Subsequently, the color-change material 1 was brought into contact with 10° C. cold water. As a result, the porous layer 3 became transparent and the color of the reversibly thermochromic image pattern layer 21 changed from colorless to blue. Thus, the color-change material 1 came to have an appearance bearing a green flower pattern on a yellow background. This color-change material 1 was allowed to stand at 24° C. As a result, when the color-change material 1 had warmed up to a temperature above 15° C., the reversibly thermochromic image pattern layer 21 was decolored and the color-change material 1 wholly turned yellow. Although the color-change material 1 was in this state for a while, it returned to the white color upon drying.

As demonstrated above, the color-change material 1 changed its appearance from a wholly white state to a wholly yellow state or to a green flower pattern on a yellow background upon application of cold or warm water, and recovered the original white state upon drying. Namely, the color-change material 1 could undergo a variety of changes in appearance.

These changes in appearance could be reproduced repeatedly.

Figure 5:
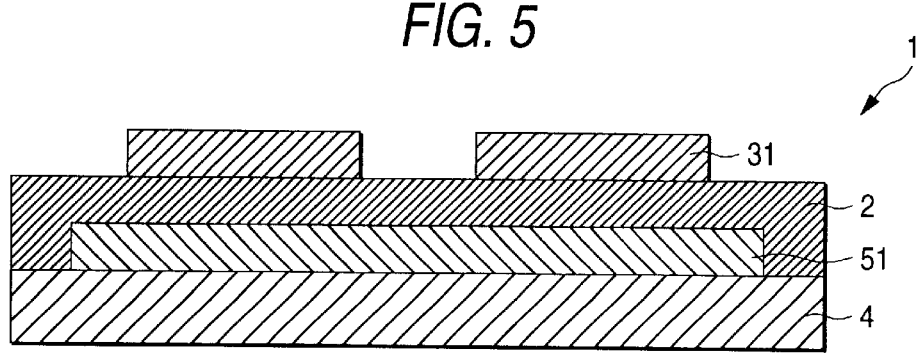
FIG. 5 is a vertical sectional view illustrating still a further embodiment of the color-change materials of the invention.

Example 5 (see FIG. 5)

A flower pattern was printed on a white polyester satin as a substrate 4 with fluorescent general inks of yellow, pink, purple, green, and red colors to form a non-color-changing image pattern layer 51.

A reversibly thermochromic screen printing ink prepared by stirring and homogenizing a mixture of 10 parts of a microcapsular pigment containing a reversibly thermochromic material encapsulated therein (black←→colorless; black below 30° C. colorless at 30° C. and higher), 20 parts of a polyester urethane emulsion (solid content, 30%), 0.4 parts of a silicone antifoamer, 1 part of water, 0.5 parts of ethylene glycol, 1.0 part of a thickener, and 0.5 parts of an isocyanate crosslinking agent was used to conduct solid printing through a 109-mesh screen stencil on the whole surface of the non-color-changing image pattern layer 51. The ink applied was dried and cured at 130° C. for 5 minutes to form a reversibly thermochromic layer 2.

The resultant stacked structure having the non-color-changing layer 51 and the reversibly thermochromic layer 2 superposed thereon was black at 24° C. Upon heating to 30° C. or higher, the reversibly thermochromic layer 2 was decolored and the colorful flower pattern attributable to the non-color-changing image pattern layer 51 was perceived. When this stacked structure returned to a temperature below 30° C., the reversibly thermochromic layer 2 assumed black color to hide the flower pattern.

Subsequently, a white screen printing ink prepared by stirring and homogenizing a mixture of 15 parts of a fine silica powder [trade name, Nipsil E-220; manufactured by Nippon Silica Industrial Co., Ltd.], 50 parts of a polyester urethane emulsion (solid content, 30%), 30 parts of water, 0.5 parts of a silicone antifoamer, 3 parts of a thickener for water-based inks, 1 part of ethylene glycol, and 2 parts of a blocked isocyanate crosslinking agent was used to print a butterfly pattern through a 150-mesh screen stencil on the reversibly thermochromic layer 2. The ink applied was dried and cured at 130° C. for 5 minutes to form a porous image pattern layer 31 of a butterfly pattern. Thus, a color-change material 1 was obtained.

The appearance of the porous image pattern layer 31 changed from a white state to a colorless and transparent state upon contact with water or a water-soluble liquid.

When the color-change material 1 was held at 24° C., the white butterfly pattern attributable to the porous image pattern layer 31 was perceived on the black background of the reversibly thermochromic layer 2. When the color-change material 1 was heated to 30° C. or higher, the color of the reversibly thermochromic layer 2 changed from black to colorless and the colorful flower pattern attributable to the non-color-changing image pattern layer 51 appeared. Thus, the color-change material 1 came to have an appearance bearing a white butterfly pattern on a flower pattern background. When this color-change material 1 returned to a temperature below 30° C., it recovered the appearance bearing a white butterfly pattern on a black background.

The color-change material 1 was brought into contact with 20° C. water. As a result, the porous image pattern layer 31 became transparent and the butterfly pattern hence disappeared, resulting in a wholly black appearance. This color-change material 1 was allowed to stand at 24° C. As a result, a white butterfly pattern gradually appeared with water vaporization. After completion of drying, a white butterfly pattern on a black background was perceived again.

Subsequently, the color-change material 1 was brought into contact with 40° C. warm water. As a result, the porous image pattern layer 31 became transparent to make the butterfly pattern disappear and, simultaneously therewith, the color of the reversibly thermochromic layer 2 changed from black to colorless, whereby only the colorful flower pattern attributable to the non-color-changing image pattern layer 51 was perceived. This color-change material 1 was allowed to stand at 24° C. As a result, when the color-change material had cooled down to a temperature below 30° C., the reversibly thermochromic layer 2 became colored and this black color hid the flower pattern. Although the color-change material 1 was in this state for a while, a white butterfly pattern gradually appeared on the black background with drying. Upon complete drying, the color-change material 1 recovered the appearance bearing a white butterfly pattern on a black background.

As demonstrated above, the color-change material 1, according to temperature changes or immersion in warm or cold water, could have four states: an appearance bearing a white butterfly pattern on a black background; a wholly black appearance; an appearance bearing a white butterfly pattern on a colorful flower pattern background; and an appearance bearing a colorful flower pattern only. Namely, the color-change material 1 could undergo a variety of changes in appearance.

These changes in appearance could be reproduced repeatedly.

Figure 6:
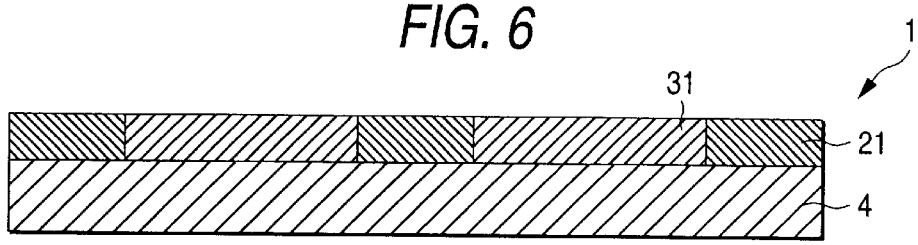
FIG. 6 is a vertical sectional view illustrating still a further embodiment of the color-change materials of the invention.

Example 6 (see FIG. 6)

A white screen printing ink prepared by stirring and homogenizing a mixture of 15 parts of a fine silica powder [trade name, Nipsil E-200; manufactured by Nippon Silica Industrial Co., Ltd.], 30 parts of an acrylic ester emulsion (solid content, 50%), 50 parts of water, 0.5 parts of a silicone antifoamer, 3 parts of a thickener for water-based inks, 1 part of ethylene glycol, and 3 parts of a blocked isocyanate crosslinking agent was used to print a flower pattern through a 180-mesh screen stencil on a pink nylon taffeta as a substrate 4. The ink applied was dried and cured at 130° C. for 5 minutes to form a porous image pattern layer 31.

A reversibly thermochromic screen printing ink prepared by stirring and homogenizing a mixture of 10 parts of a microcapsular pigment containing a thermochromic color-memory material encapsulated therein (blue←→colorless; blue at 15° C. and lower, colorless at 30° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to conduct printing through a 109-mesh screen stencil on those areas of the substrate 4 where the porous image pattern layer 31 had not been formed. The ink applied was dried and cured at 130° C. for 5 minutes to form a reversibly thermochromic image pattern layer 21.

Thus, a color-change material 1 was obtained, which had the substrate 4 and, formed side by side thereon, the porous image pattern layer 31 and the reversibly thermochromic image pattern layer 21.

When the color-change material 1 was cooled to 15° C. or lower, the flower pattern of the porous image pattern layer 31 was perceived together with purple parts resulting from the mixing of the pink of the substrate 4 and the blue of the reversibly thermochromic image pattern layer 21. This appearance was maintained in a temperature range below 30° C. Upon heating to 30° C. or higher, the reversibly thermochromic image pattern layer 21 became colorless and the flower pattern of the porous image pattern layer 31 was perceived together with the pink parts attributable to the substrate 4. This appearance was maintained in a temperature range above 15° C.

When the color-change material 1 was brought into contact with cold water having a temperature of 15° C. or lower, the porous image pattern layer 31 became transparent due to the adherent water and a flower pattern of the pink color attributable to the underlying substrate 4 was perceived together with purple parts. This color-change material 1 was allowed to stand at 24° C. As a result, the wet porous image pattern layer 31 gradually changed its color from pink to white with water vaporization, and recovered the original white color upon completion of drying.

Subsequently, the color-change material 1 was brought into contact with warm water having a temperature of 30° C. or higher. As a result, the porous image pattern layer 31 became transparent due to the adherent water and the color of the reversibly thermochromic layer changed from blue to colorless. Thus, the color-change material 1 assumed the pink color attributable to the substrate 4.

This pink color-change material 1 was allowed to stand at 24° C. As a result, the wet porous image pattern layer 31 gradually changed its color from pink to white with water vaporization, and recovered the original white color upon completion of drying.

As demonstrated above, the color-change material 1 could have four states: an appearance having purple parts and a white flower pattern; an appearance having pink parts and a white flower pattern; an appearance having purple parts and a pink flower pattern; and a wholly pink appearance. Namely, the color-change material 1 could undergo a variety of changes in appearance.

These changes in appearance could be reproduced repeatedly.

Figure 7:
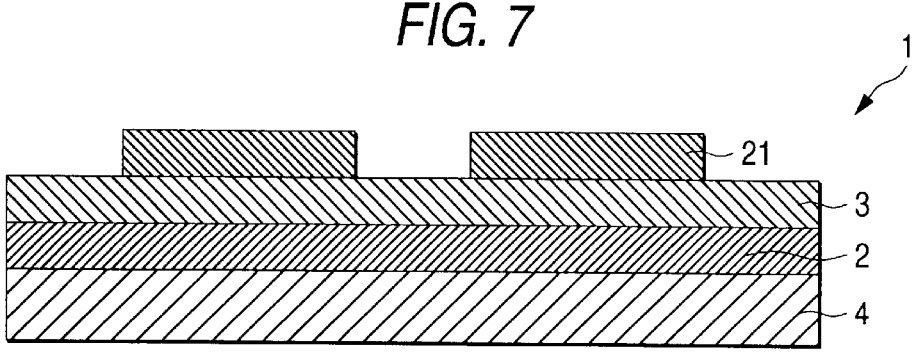
FIG. 7 is a vertical sectional view illustrating still a further embodiment of the color-change materials of the invention.

Example 7 (see FIG. 7)

A reversibly thermochromic screen printing ink prepared by stirring and homogenizing a mixture of 10 parts of a microcapsular pigment containing a thermochromic color-memory material encapsulated therein (blue←→colorless; blue at 15° C. and lower, colorless at 30° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to conduct solid printing through a 109-mesh screen stencil on the whole surface of a yellow nylon taffeta as a substrate 4. The ink applied was dried and cured at 130° C. for 5 minutes to form a reversibly thermochromic layer 2.

Subsequently, a white screen printing ink prepared by stirring and homogenizing a mixture of 15 parts of a fine silica powder [trade name, Nipsil E-200; manufactured by Nippon Silica Industrial Co., Ltd.], 30 parts of an acrylic ester emulsion (solid content, 50%), 50 parts of water, 0.5 parts of a silicone antifoamer, 3 parts of a thickener for water-based inks, 1 part of ethylene glycol, and 3 parts of a blocked isocyanate crosslinking agent was used to conduct solid printing through a 180-mesh screen stencil on the whole surface of the reversibly thermochromic layer 2. The ink applied was dried and cured at 130° C. for 5 minutes to form a porous layer 3, which was white in a dry state.

Furthermore, a reversibly thermochromic screen printing ink prepared by stirring and homogenizing a mixture of 10 parts of a microcapsular pigment containing a thermochromic color-memory material encapsulated therein (pink←→colorless; pink at 40° C. and lower, colorless at 40° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to print a polka dot pattern through a 180-mesh screen stencil. The ink applied was dried and cured at 130° C. for 5 minutes to form a reversibly thermochromic image pattern layer 21. Thus, a color-change material 1 was obtained.

When the color-change material 1 in a dry state was held at 24° C., a polka dot pattern of the pink color attributable to the reversibly thermochromic image pattern layer 21 was perceived on the white background attributable to the porous layer 3. However, upon heating to 40° C. or higher, the reversibly thermochromic image pattern layer 21 was decolored, resulting in a wholly white state. When the heating was stopped and this color-change material 1 was allowed to cool down to 40° C. or lower, then the pink polka dot patten attributable to the reversibly thermochromic image pattern layer 21 appeared again. This phenomenon could be repeated many times.

Subsequently, the color-change material 1 was brought into contact with 35° C. warm water. As a result, the porous layer 3 became transparent due to the adherent water and the color of the reversibly thermochromic layer 2 changed from blue to colorless. Thus, a polka dot pattern of red color resulting from the mixing of the pink of the reversibly thermochromic image pattern layer 21 and the yellow of the substrate 4 was perceived on the yellow background attributable to the substrate 4.

When this color-change material 1 was immersed in warm water having a temperature of 40° C. or higher, the reversibly thermochromic image pattern layer 21 was decolored, resulting in a wholly yellow state. This yellow color-change material 1 was allowed to stand at 24° C. As a result, the color-change material 1 in a still wet state developed a red polka dot pattern on the yellow background. The yellow background gradually turned white with water vaporization, and after completion of drying, the original appearance bearing a pink polka dot pattern on a white background was perceived.

Subsequently, the dry color-change material 1 was brought into contact with cold water having a temperature of 15° C. or lower. As a result, a polka dot pattern of brown color resulting form the mixing of the pink of the reversibly thermochromic image pattern layer 21 and the green resulting from the mixing of the yellow of the substrate 4 and the blue of the reversibly thermochromic layer 2 was perceived on a background of that green color. This state was maintained when the color-change material 1 was immersed in the cold water having a temperature of 15° C. or lower or was in a wet state at 24° C. However, the green color gradually changed to white with drying, and after completion of drying, the original appearance bearing a pink polka dot pattern on a white background was perceived.

As demonstrated above, the color-change material 1 could undergo a variety of changes in appearance according to temperature changes, wetting by a water medium, and drying.

These changes in appearance could be reproduced repeatedly.

Figure 8:
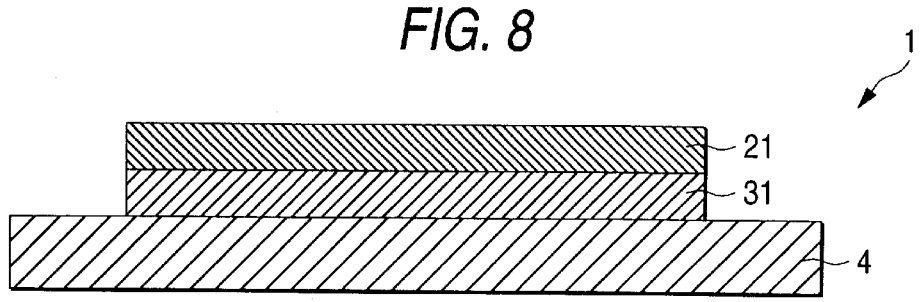
FIG. 8 is a vertical sectional view illustrating still a further embodiment of the color-change materials of the invention.

Example 8 (see FIG. 8)

A water-based spray ink prepared by stirring and homogenizing a mixture of 10 parts of a wet-process finely particulate silicic acid [trade name, Nipsil E-200A; manufactured by Nippon Silica Industrial Co., Ltd.] as a low-refractive-index pigment, 30 parts of a water-compatible urethane resin [trade name, Hydran APX101; manufactured by Dainippon Ink & Chemicals, Inc.] as a binder, 10 parts of water, 20 parts of isopropyl alcohol, and 0.5 parts of a silicone antifoamer was applied by spraying on the body of a blue minicar made of ABS as a substrate 4 to form a star pattern on the body. The ink applied was dried at 40° C. for about 1 hour to form a porous image pattern layer 31.

Subsequently, a water-based spray ink prepared by stirring and homogenizing a mixture of 25 parts of a microcapsular pigment containing a reversibly thermochromic material encapsulated therein (water content, 50%; pink←→colorless; pink below 30° C., colorless at 30° C. and higher), 40 parts of a water-compatible urethane resin [trade name, Hydran APX101; manufactured by Dainippon Ink & Chemicals, Inc.], 10 parts of water, 20 parts of isopropyl alcohol, and 0.5 parts of a silicone antifoamer was applied by spraying on the porous image pattern layer 31 to form thereon a star pattern having the same shape and size as the layer 31. Thus, a reversibly thermochromic image pattern layer 21 was formed to obtain a color-change material 1.

The color-change material 1 at 24° C. bore a star pattern of the pink color attributable to the reversibly thermochromic image pattern layer 21 on the blue body. However, when this color-change material 1 was heated with hot air from a drier, the reversibly thermochromic image pattern layer 21 was decolored and a star pattern of the white color attributable to the porous image pattern layer 31 was perceived. This state was maintained at temperatures not lower than 30° C. However, when the heating was stopped and the color-change material 1 was allowed to stand at room temperature, then the reversibly thermochromic image pattern layer 21 became colored again and the color-change material 1 recovered the pink star pattern.

Subsequently, this color-change material 1 was immersed in 40° C. warm water. As a result, the reversibly thermochromic patten layer 21 was decolored and the porous image pattern layer 31 became transparent. The body thus turned wholly blue. This state was maintained in the warm water. However, when this color-change material 1 was taken out of the warm water and immersed in water having a temperature of about 20° C., then the reversibly thermochromic image pattern layer assumed pink color and, hence, the star pattern changed its color to purple color resulting from the mixing of the blue of the substrate 4 and the pink of the reversibly thermochromic image pattern layer 21. This state was maintained in the water. However, when this color-change material 1 was taken out of the water and dried, it recovered the original appearance bearing a pink star pattern on the blue body.

As demonstrated above, the color-change material 1 could undergo a variety of changes in appearance according to temperature changes, wetting by a water medium, and drying.

These changes in appearance could be reproduced repeatedly.

Figure 9:
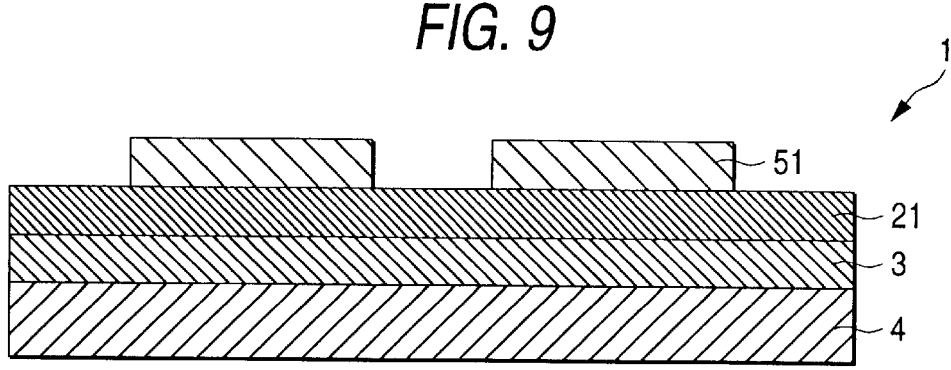
FIG. 9 is a vertical sectional view illustrating still a further embodiment of the color-change materials of the invention.

Example 9 (see FIG. 9)

A white water-based screen printing ink prepared by stirring and homogenizing a mixture of 20 parts of a wet-process finely particulate silicic acid [trade name, Nipsil E1011; manufactured by Nippon Silica Industrial Co., Ltd.] as a low-refractive-index pigment, 60 parts of an aqueous urethane emulsion [trade name, Hydran AP-10; manufactured by Dainippon Ink & Chemicals, Inc.] as a binder, 15 parts of water, 3 parts of propylene glycol, 0.5 parts of a silicone antifoamer, 3 parts of a thickener for water-based inks, and 4.0 parts of a blocked isocyanate crosslinking agent for water-based inks was used to conduct printing through a 150-mesh screen stencil on the whole surface of a 40-denier nylon tricot of fluorescent pink color as a substrate 4 to form a porous layer 3.

Subsequently, a wave pattern was printed on the porous layer 3 through a 150-mesh screen stencil using a yellow water-based screen printing ink (color-changing material) prepared by stirring and homogenizing a mixture of 30 parts of a microcapsular pigment containing a reversibly thermochromic material encapsulated therein (water content, 50 wt %; yellow←→colorless; yellow below 15° C., colorless at 15° C. and higher), 35 parts of an aqueous acrylic emulsion [trade name, Movinyl 700; manufactured by Hoechst Gosei K.K.] as a binder, 15 parts of water, 3 parts of propylene glycol, 0.5 parts of a silicone antifoamer, 3 parts of a thickener for water-based inks, and 3.5 parts of a blocked isocyanate crosslinking agent for water-based inks, and further using a blue water-based screen printing ink prepared in the same manner as the above except that use was made of 15 parts of a microcapsular pigment containing a reversibly thermochromic material encapsulated therein (water content, 50 wt %; blue←→colorless; blue below 15° C., colorless at 15° C. and higher). The inks applied were dried and cured at 100° C. for 3 minutes to form a reversibly thermochromic image pattern layer 21.

Furthermore, a polka dot pattern was printed on the reversibly thermochromic image pattern layer 21 through a 180-mesh screen stencil using a pink water-based screen printing ink prepared by stirring and homogenizing a mixture of 10 parts of a fluorescent pink pigment [trade name, Epocolor FP-1000N; manufactured by Nippon Shokubai Kagaku Kogyo Co., Ltd.], 60 parts of an aqueous acrylic emulsion [trade name, Polysol AP-50; manufactured by Showa Highpolymer Co., Ltd.], 10 parts of water, 5 parts of ethylene glycol, 0.5 parts of a silicone antifoamer for water-based inks, 3 parts of a thickener for water-based inks, 1 part of a leveling agent, and 2 parts of an isocyanate crosslinking agent. The ink applied was cured and dried at 130° C. for 3 minutes to form a non-color-changing image pattern layer 51. Thus, a color-change material 1 was obtained.

The color-change material 1 at about 24° C. had an appearance bearing a polka dot pattern of the fluorescent pink color attributable to the non-color-changing image pattern layer 51 on the white background attributable to the porous layer 3. However, upon cooling with cold air to below 15° C., the reversibly thermochromic image pattern layer 21 became colored and the white background part came to have a wave pattern of yellow and blue colors. This state was maintained at temperatures not higher than 15° C. However, when the cooling was stopped and this color-change material 1 was allowed to stand at room temperature, the wave pattern part returned to white.

Subsequently, the color-change material 1 was immersed in water having a temperature of about 20° C. As a result, the porous layer 3 became transparent and, hence, the pink color of the non-color-changing image pattern layer 51 combined with the pink color of the substrate 4 made the whole surface fluorescent-pink. This state was maintained in the water. When this color-change material 1 was immersed in 10° C. water, the reversibly thermochromic image pattern layer 21 became colored. As a result, the above state was changed to an appearance bearing a polka dot pattern of the fluorescent pink color attributable to the non-color-changing image pattern layer 51 on a wave pattern background of two colors, i.e., purple color resulting from the mixing of blue and fluorescent-pink and red color resulting from the mixing of yellow and fluorescent-pink. This state was maintained in the water.

This color-change material 1 was taken out of the water and allowed to stand at room temperature. As a result, the reversibly thermochromic image pattern layer 21 was decolored, and the color-change material 1 in a still wet state changed its appearance from the aforementioned state to a wholly pink state. Upon completion of drying, the color-change material 1 came to have an appearance bearing a fluorescent pink polka dot pattern on a white background.

As demonstrated above, the color-change material 1 could undergo a variety of changes in color tone and design according to temperature changes, wetting by a water medium, and drying.

These changes in appearance could be reproduced repeatedly.

Figure 10:
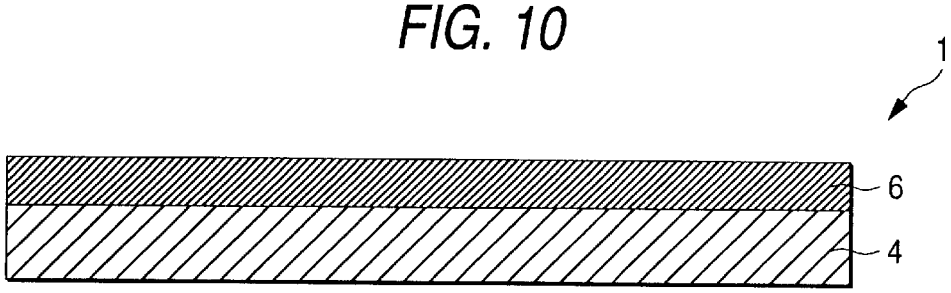
FIG. 10 is a vertical sectional view illustrating still a further embodiment of the color-change materials of the invention.

Example 10 (see FIG. 10)

A water-based screen printing ink (color-changing material) prepared by stirring and homogenizing a mixture of 20 parts of a microcapsular pigment containing a reversibly thermochromic material encapsulated therein (water content, 50 wt %; blue←—→colorless; blue below 30° C., colorless at 30° C. and higher), 10 parts of a wet-process finely particulate silicic acid [trade name, Nipsil E-200; manufactured by Nippon Silica Industrial Co., Ltd.] as a low-refractive-index pigment, 45 parts of an aqueous urethane emulsion [trade name, Hydran AP-10; manufactured by Dainippon Ink & Chemicals, Inc.] as a binder, 15 parts of water, 3 parts of propylene glycol, 0.5 parts of a silicone antifoamer, 3 parts of a thickener for water-based inks, and 3.5 parts of a blocked isocyanate crosslinking agent for water-based inks was used to conduct solid printing through a 150-mesh screen stencil on the whole surface of a 50 μm-thick transparent poly(ethylene terephthalate) film as a substrate 4. The ink applied was cured and dried at 100° C. for 3 minutes to form a color-changing porous layer 6. Thus, a color-change material 1 was obtained.

The color-change material 1 was blue and opaque in a dry state at 24° C. However, when the color-change material 1 was heated to 30° C. or higher with dry warm air, the color-changing porous layer 6 was decolored and the color-change material 1 hence came into a white and opaque state. This appearance was maintained at temperatures not lower than 30° C. However, when the air blowing was stopped and this color-change material 1 cooled down to below 30° C., then it returned to the original blue and opaque state.

When the color-change material 1 was immersed in 40° C. warm water, the color-changing porous layer 6 was decolored and the color-change material 1 came into a colorless and translucent state. This state was maintained in the warm water. When this color-change material 1 was immersed in 20° C. water, the color-changing porous layer 6 turned blue and, hence, the colorless and translucent state changed to a blue and translucent state. When this color-change material 1 was taken out of the water and allowed to stand, transparency was gradually lost with drying. Upon complete drying, the color-change material 1 returned to the blue and opaque state.

As demonstrated above, the color-change material 1 could undergo a variety of changes in color tone according to temperature changes, wetting by a water medium, and drying.

These changes in appearance could be reproduced repeatedly.

The degree of transparency of the above translucent color-change material 1 was sufficient for an article, etc. placed on the back of the color-change material 1 to be perceived.

Figure 11:
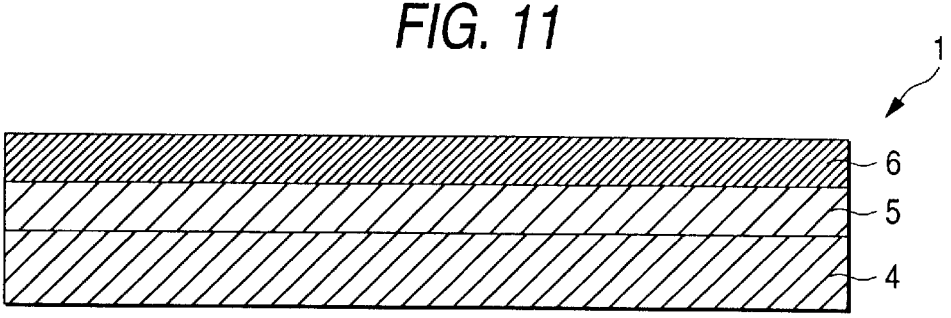
FIG. 11 is a vertical sectional view illustrating still a further embodiment of the color-change materials of the invention.

Example 11 (see FIG. 11)

A pink water-based screen printing ink prepared by stirring and homogenizing a mixture of 10 parts of a pink fluorescent pigment [trade name, Epocolor FP-10; manufactured by Nippon Shokubai Kagaku Kogyo K.K.], 60 parts of an aqueous urethane emulsion [trade name, NeoRez-R972; manufactured by Zeneka K.K.], 10 parts of water, 5 parts of ethylene glycol, 0.5 parts of a silicone antifoamer for water-based inks, 3 parts of a thickener for water-based inks, 1 part of a leveling agent, and 2 parts of an epoxy crosslinking agent was used to conduct solid printing through a 150-mesh screen stencil on the whole surface of a 110 μm-thick white synthetic paper as a substrate 4. The ink applied was dried and cured at 80° C. for about 5 minutes to form a pink non-color-changing layer 5.

Subsequently, a water-based screen printing ink (color-changing material) prepared by stirring and homogenizing a mixture of 20 parts of a microcapsular pigment containing a reversibly thermochromic material encapsulated therein (water content, 50 wt %; blue←—→colorless; blue below 30° C., colorless at 30° C. and higher), 10 parts of wet-process finely particulate silicic acid [trade name, Nipsil E-200A; manufactured by Nippon Silica Industrial Co., Ltd.] as a low-refractive-index pigment, 45 parts of an aqueous acrylic emulsion [trade name, Movinyl 972; manufactured by Hoechst Gosei K.K.] as a binder, 15 parts of water, 3 parts of propylene glycol, 0.5 parts of a silicone antifoamer, 3 parts of a thickener for water-based inks, and 3.5 parts of a blocked isocyanate crosslinking agent for water-based inks was used to conduct solid printing through a 180-mesh screen stencil on the whole surface of the non-color-changing layer 5. The ink applied was dried and cured at 100° C. for 3 minutes to form a color-changing porous layer 6. Thus, a color-change material 1 was obtained.

When the color-change material 1 was held at 24° C., the color-changing porous layer 6 was blue. However, upon heating to 30° C. or higher with dry hot air, the blue color was bleached, resulting in a white state. The color-change material 1 was in this state at temperatures not lower than 30° C. However, when the air blowing was stopped and this color-change material 1 cooled down to below 30° C., it recovered the original blue color.

When the color-change material 1 was immersed in 40° C. warm water, the color-changing porous layer 6 lost the blue color and became translucent and, hence, the pink color of the non-color-changing layer 5 was perceived. This state was maintained in the 40° C. warm water. Thereafter, this color-change material 1 was taken out of the 40° C. warm water and immersed in water having a temperature of about 20° C. As a result, the color-changing porous layer 6 came into a blue and translucent state, whereby the color-change material 1 assumed purple color resulting from the mixing of blue and pink. This color-change material 1 was taken out of the water and allowed to stand at room temperature. As a result, the color-changing porous layer 6 gradually became opaque with drying and, hence, the purple color gradually changed into blue. Upon complete drying, the color-change material 1 recovered the original blue color.

As demonstrated above, the color-change material 1 could undergo a variety of changes in color tone according to temperature changes, wetting by a water medium, and drying.

These changes in appearance could be reproduced repeatedly.

Figure 12:
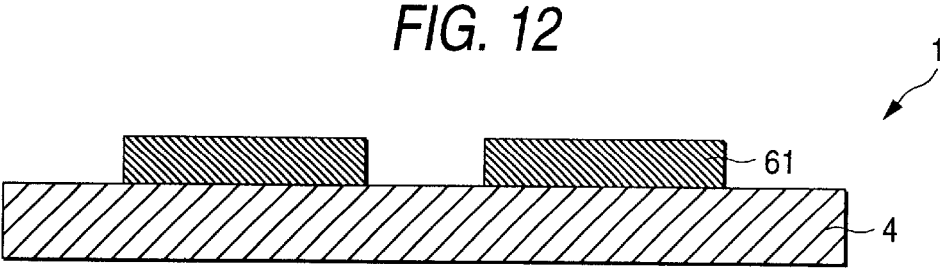
FIG. 12 is a vertical sectional view illustrating still a further embodiment of the color-change materials of the invention.

Example 12 (see FIG. 12)

A butterfly pattern was printed on a yellow polyester satin as a substrate 4 through a 180-mesh screen stencil using a pink water-based screen printing ink (color-changing material) prepared by stirring and homogenizing a mixture of 15 parts of a microcapsular pigment containing a reversibly thermochromic material encapsulated therein (water content 50 wt %; pink←—→colorless; pink below 28° C., colorless at 28° C. and higher), 15 parts of dry-process finely particulate silicic acid [trade name, Aerosil OX50; manufactured by Nippon Aerosil Co., Ltd.] as a low-refractive-index pigment, 40 parts of an aqueous urethane emulsion [trade name, Hydran HW930; manufactured by Dainippon Ink & Chemicals, Inc.] as a binder, 15 parts of water, 3 parts of propylene glycol, 0.5 parts of a silicone antifoamer, 3 parts of a thickener for water-based inks, and 4.0 parts of a blocked isocyanate crosslinking agent for water-based inks, and further using a blue water-based screen printing ink (color-changing material) prepared in the same manner as the above excellent that use was made of 15 parts of a microcapsular pigment containing a reversibly thermochromic material encapsulated therein (water content, 50 wt %; blue←—→colorless; blue below 28° C., colorless at 28° C. and higher). The inks applied were cured and dried at 130° C. for 3 minutes to form a color-changing porous image pattern layer 61. Thus, a color-change material 1 was obtained.

The color-change material 1 at 24° C. had an appearance bearing a butterfly pattern of pink and blue colors on a yellow background. However, upon heating to 28° C. or higher by a finger touch, the color-changing porous image pattern layer 61 was decolored and the butterfly pattern hence turned white. This state was maintained at temperatures not lower than 28° C. However, when this color-change material 1 cooled down to below 28° C., it recovered the butterfly pattern of pink and blue colors.

Subsequently, the color-change material 1 was immersed in 35° C. warm water. As a result, the color-changing porous image pattern layer 61 was decolored and became translucent, resulting in a wholly yellow appearance. This state was maintained in warm water having a temperature of 28° C. or higher. This color-change material 1 was taken out of the warm water and immersed in water having a temperature of about 20° C. As a result, the color-changing porous image pattern layer 61 became colored, and a butterfly pattern appeared which had two colors, i.e., red color resulting from the mixing of pink and yellow and green color resulting from the mixing of blue and yellow. This color-change material 1 was taken out of the water and allowed to stand at room temperature. As a result, the color tones of the butterfly pattern changed with drying, and upon complete drying, the color-change material 1 recovered the butterfly pattern of pink and blue colors on a yellow background.

As demonstrated above, the color-change material 1 could undergo a variety of changes in appearance according to temperature changes, wetting by a water medium, and drying.

These changes in appearance could be reproduced repeatedly.

Figure 13:
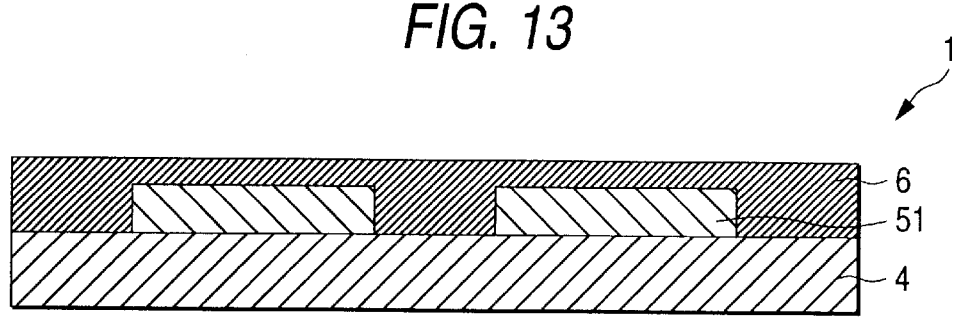
FIG. 13 is a vertical sectional view illustrating still a further embodiment of the color-change materials of the invention.

Example 13 (see FIG. 13)

On a 110 μm-thick white synthetic paper as a substrate 4 were printed, through a 150-mesh screen stencil, a heart pattern and a star pattern respectively using: a pink water-based screen printing ink prepared by stirring and homogenizing a mixture of 10 parts of a pink fluorescent pigment [trade name, Epocolor FP-10; manufactured by Nippon Shokubai Kagaku Kogyo K.K.], 60 parts of an aqueous urethane emulsion [trade name, NeoRez-R972; manufactured by Zeneka K.K.], 10 parts of water, 5 parts of ethylene glycol, 0.5 parts of a silicone antifoamer for water-based inks, 3 parts of a thickener for water-based inks, 1 part of a leveling agent, and 2 parts of an epoxy crosslinking agent; and a yellow water-based screen printing ink prepared by stirring and homogenizing a mixture of 10 parts of a yellow fluorescent pigment [trade name, Epocolor FP-117; manufactured by Nippon Shokubai Kagaku Kogyo K.K.], 60 parts of an aqueous urethane emulsion [trade name, NeoRez-R972; manufactured by Zeneka K.K.], 10 parts of water, 5 parts of ethylene glycol, 0.5 parts of a silicone antifoamer for water-based inks, 3 parts of a thickener for water-based inks, 1 part of a leveling agent, and 2 parts of an epoxy crosslinking agent. The inks applied were dried and cured at 60° C. for about 5 minutes to form a non-color-changing image pattern layer 51.

Subsequently, a water-based screen printing ink (color-changing material) prepared by stirring and homogenizing a mixture of 20 parts of a microcapsular pigment containing a reversibly thermochromic material encapsulated therein (water content, 50 wt %; blue←—→colorless; blue below 30° C., colorless at 30° C. and higher), 10 parts of wet-process finely particulate silicic acid [trade name, Nipsil E-200A; manufactured by Nippon Silica Industrial Co., Ltd.] as a low-refractive-index pigment, 50 parts of an aqueous urethane emulsion [trade name, Hydran AP-20; manufactured by Dainippon Ink & Chemicals, Inc.] as a binder, 15 parts of water, 3 parts of propylene glycol, 0.5 parts of a silicone antifoamer, 3 parts of a thickener for water-based inks, and 3.5 parts of an epoxy crosslinking agent for water-based inks was used to conduct solid printing through a 109-mesh screen stencil on the whole surface of the non-color-changing image pattern layer 51. The ink applied was cured and dried at 70° C. for 3 minutes to form a color-changing porous layer 6. Thus, a color-change material 1 was obtained.

The color-change material 1 was wholly blue at 24° C. However, upon heating to 30° C. or higher with dry hot air, the color-changing porous layer 6 was decolored, resulting in a wholly white appearance. This state was maintained at temperatures not lower than 30° C. However, when the air blowing was stopped and this color-change material 1 cooled down to below 30° C., it recovered the original blue color.

Subsequently, the color-change material 1 was immersed in 40° C. warm water. As a result, the color-changing porous layer 6 was decolored and became translucent, whereby the color-change material 1 came to have an appearance bearing a pink heart pattern and a yellow star pattern on a white background. This state was maintained in the 40° C. warm water. When this color-change material 1 was taken out of the 40° C. warm water and immersed in tap water having a temperature of about 20° C., the color-changing porous layer 6 became colored and the color-change material 1 hence came to have an appearance bearing on a blue background a heart pattern of purple color resulting from the mixing of blue and pink and a star pattern of green color resulting from the mixing of blue and yellow. This color-change material 1 was taken out of the tap water and allowed to stand at room temperature. As a result, the whole surface gradually turned blue with drying, and upon complete drying, the color-change material 1 returned to the original wholly blue state.

As demonstrated above, the color-change material 1 could undergo a variety of changes in appearance according to temperature changes, wetting by a water medium, and drying.

These changes in appearance could be reproduced repeatedly.

Figure 14:
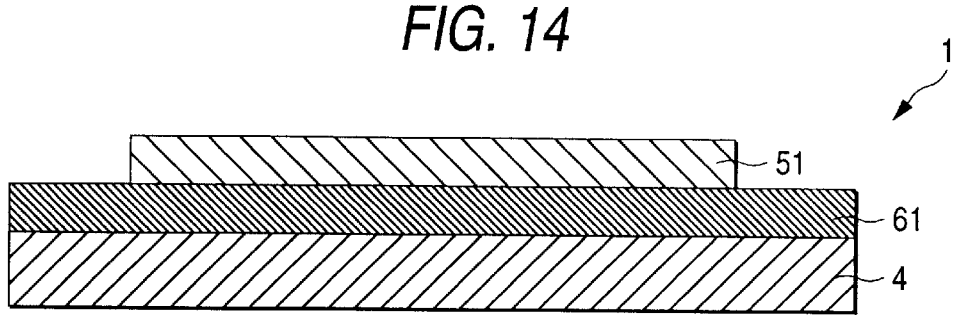
FIG. 14 is a vertical sectional view illustrating still a further embodiment of the color-change materials of the invention.

Example 14 (see FIG. 14)

A wave pattern was printed through a 150-mesh screen stencil on a 40-denier nylon tricot of fluorescent pink color as a substrate 4 using a yellow water-based screen printing ink (color-changing material) prepared by stirring and homogenizing a mixture of 15 parts of a microcapsular pigment containing a reversibly thermochromic material encapsulated therein (water content, 50 wt %; yellow←→colorless; yellow below 15° C., colorless at 15° C. and higher), 15 parts of wet-process finely particulate silicic acid [trade name, Nipsil E-1011; manufactured by Nippon Silica Industrial Co., Ltd.] as a low-refractive-index pigment, 35 parts of an aqueous acrylic emulsion [trade name, Movinyl 700; manufactured by Hoechst Gosei K.K.] as a binder, 15 parts of water, 3 parts of propylene glycol, 0.5 parts of a silicone antifoamer, 3 parts of a thickener for water-based inks, and 3.5 parts of a blocked isocyanate crosslinking agent for water-based inks, and further using a blue water-based screen printing ink (color-changing material) prepared in the same manner as the above except that use was made of 15 parts of a microcapsular pigment containing a reversibly thermochromic material encapsulated therein (water content, 50 wt %; blue←→colorless; blue below 15° C., colorless at 15° C. and higher). The inks applied were cured and dried at 100° C. for 3 minutes to form a color-changing porous image pattern layer 61.

Furthermore, a polka dot pattern was printed on the color-changing porous image pattern layer 61 through a 180-mesh screen stencil using a pink water-based screen printing ink prepared by stirring and homogenizing a mixture of 10 parts of a fluorescent pink pigment [trade name, Epocolor FP-1000N; manufactured by Nippon Shokubai Kagaku Kogyo Co., Ltd.], 60 parts of an aqueous acrylic emulsion [trade name, Polysol AP-50; manufactured by Showa Highpolymer Co., Ltd.], 10 parts of water, 5 parts of ethylene glycol, 0.5 parts of a silicone antifoamer for water-based inks, 3 parts of a thickener for water-based inks, 1 part of a leveling agent, and 2 parts of an isocyanate crosslinking agent. The ink applied was cured and dried at 130° C. for 3 minutes to form a non-color-changing image pattern layer 51. Thus, a color-change material 1 was obtained.

The color-change material 1 at about 24° C. had an appearance bearing a fluorescent pink polka dot pattern on a white background. However, upon cooling with cold air to below 15° C., the white background part became a wave pattern of yellow and blue colors. This state was maintained at temperatures not higher than 15° C. However, when the cooling was stopped and this color-change material 1 was allowed to stand at room temperature, the wave pattern part returned to white.

Subsequently, the color-change material 1 was immersed in water having a temperature of about 20° C. As a result, the color-changing porous image pattern layer 61 was decolored and became translucent and, hence, the color of the non-color-changing image pattern layer 51 combined with the color of the substrate 4 made the whole surface fluorescent-pink. This state was maintained in the water. However, when this color-change material 1 was immersed in 10° C. ice water, the color-changing porous image pattern layer 61 became colored. As a result, the above state was changed to an appearance bearing a polka dot pattern of the fluorescent pink color attributable to the non-color-changing image pattern layer 51 on a wave pattern background of two colors, i.e., purple color resulting from the mixing of blue and fluorescent-pink and red color resulting from the mixing of yellow and fluorescent-pink. This state was maintained in the 10° C. ice water.

This color-change material 1 was taken out of the ice water and allowed to stand at room temperature. As a result, the color-change material 1 in a still wet state changed its appearance from the aforementioned state to a wholly pink state. Upon completion of drying, the color-change material 1 came to have an appearance bearing a fluorescent pink polka dot pattern on a white background.

As demonstrated above, the color-change material 1 could undergo a variety of changes in appearance according to temperature changes, wetting by a water medium, and drying.

These changes in appearance could be reproduced repeatedly.

Figure 15:
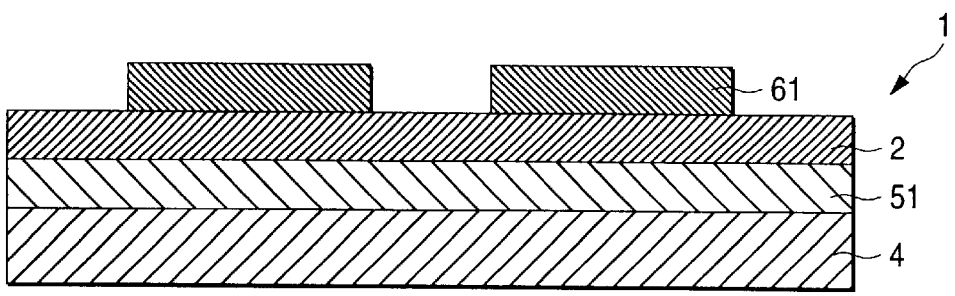
FIG. 15 is a vertical sectional view illustrating still a further embodiment of the color-change materials of the invention.

Example 15 (see FIG. 15)

A flower pattern was screen-printed on a 50-denier white polyester tricot as a substrate 4 with water-based orange, pink, blue, yellow, and green inks for fabrics. The inks applied were dried and cured at 120° C. for about 3 minutes to form a non-color-changing image pattern layer 51.

Subsequently, a reversibly thermochromic blue water-based screen printing ink (color-changing material) prepared by stirring and homogenizing a mixture of 25 parts of a microcapsular pigment containing a reversibly thermochromic material encapsulated therein (water content, 50 wt %; blue←→colorless; blue below 30° C., colorless at 30° C. and higher), 50 parts of an aqueous acrylic emulsion [trade name, Movinyl 967; manufactured by Hoechst Gosei K.K.] as a binder, 15 parts of water, 3 parts of propylene glycol, 0.5 parts of a silicone antifoamer, 3 parts of a thickener for water-based inks, and 5.0 parts of a blocked isocyanate crosslinking agent for water-based inks was used to conduct solid printing through a 80-mesh screen stencil on the whole surface of the non-color-changing image pattern layer 51. The ink applied was dried and cured at 120° C. for 3 minutes to form a reversibly thermochromic layer 2.

Furthermore, a heart pattern was printed on the reversibly thermochromic layer 2 through a 150-mesh screen stencil using a pink water-based screen printing ink (color-changing material) prepared by stirring and homogenizing a mixture of 30 parts of a microcapsular pigment containing a reversibly thermochromic material encapsulated therein (water content, 50 wt %; pink←→colorless; pink below 30° C., colorless at 30° C. and higher), 15 parts of wet-process finely particulate silicic acid [trade name, Nipsil E-1011; manufactured by Nippon Silica Industrial Co., Ltd.] as a low-refractive-index pigment, 55 parts of an aqueous urethane emulsion [trade name, Hydran HW-930; manufactured by Dainippon Ink & Chemicals, Inc.] as a binder, 10 parts of water, 3 parts of propylene glycol, 0.5 parts of a silicone antifoamer, 3 parts of a thickener for water-based inks, and 4.5 parts of a blocked isocyanate crosslinking agent for water-based inks. The ink applied was cured and dried at 100° C. for 3 minutes to form a color-changing porous image pattern layer 61. Thus, a color-change material 1 was obtained.

The color-change material 1 at 24° C. had an appearance bearing a pink heart pattern on a blue background. However, when the color-change material 1 was immersed in warm water having a temperature of about 40° C., then the reversibly thermochromic layer 2 was decolored and the color-changing porous image pattern layer 6 was decolored and became translucent, whereby the colorful flower pattern attributable to the non-color-changing image pattern layer 51 was perceived. This state was maintained in the 40° C. warm water. However, when this color-change material 1 was immersed in water having a temperature of about 20° C., the reversibly thermochromic layer 2 and the color-changing porous image pattern layer 61 became colored. As a result, the above state was changed to an appearance bearing on a blue background a heart pattern of purple color resulting from the mixing of pink and blue. This state was maintained in the water. Subsequently, this color-change material 1 was taken out of the water and allowed to stand at room temperature. As a result, the heart pattern gradually turned pink with drying. Upon complete drying, the color-change material 1 came to have an appearance bearing a pink heart pattern on a blue background.

As demonstrated above, the color-change material 1 could undergo a variety of changes in appearance according to temperature changes, wetting by a water medium, and drying.

These changes in appearance could be reproduced repeatedly.

Figure 16:
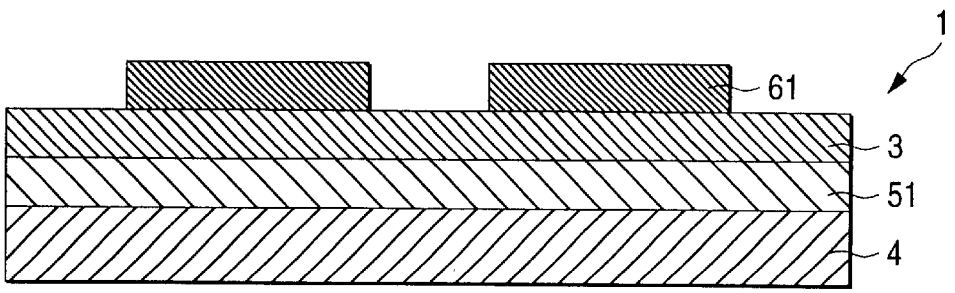
FIG. 16 is a vertical sectional view illustrating still a further embodiment of the color-change materials of the invention.

Example 16 (see FIG. 16)

Circular, triangular, and rectangular patterns were printed on a white polyester satin as a substrate 4 through a 150-mesh screen stencil using water-based screen printing inks of pink, yellow, and blue colors. The inks applied were dried and cured at 100° C. for 5 minutes to form a non-color-changing image pattern layer 51.

Subsequently, a white water-based screen printing ink prepared by stirring and homogenizing a mixture of 15 parts of wet-process finely particulate silicic acid [trade name, Nipsil E-200A; manufactured by Nippon Silica Industrial Co., Ltd.] as a low-refractive-index pigment, 30 parts of an aqueous urethane emulsion [trade name, Hydran HW-920; manufactured by Dainippon Ink & Chemicals, Inc.] as a binder, 20 parts of water, 3 parts of propylene glycol, 0.5 parts of a silicone antifoamer, 3 parts of a thickener for water-based inks, and 3.0 parts of a blocked isocyanate crosslinking agent for water-based inks was used to conduct solid printing on the non-color-changing image pattern layer 51 through a 100-mesh screen stencil. The ink applied was cured and dried at 130° C. for 3 minutes to form a porous layer 3.

Furthermore, a polka dot pattern was printed through a 150-mesh screen stencil on the porous layer 3 using: a yellow water-based screen printing ink (color-changing material) prepared by stirring and homogenizing a mixture of 15 parts of a microcapsular pigment containing a reversibly thermochromic material encapsulated therein (water content, 50 wt %; yellow←→colorless; yellow below 30° C., colorless at 30° C. and higher), 15 parts of wet-process finely particulate silicic acid [trade name, Nipsil E-1011; manufactured by Nippon Silica Industrial Co., Ltd.] as a low-refractive-index pigment, 35 parts of an aqueous urethane emulsion [trade name, Hydran HW-920; manufactured by Dainippon Ink & Chemicals, Inc.] as a binder, 15 parts of water, 3 parts of propylene glycol, 0.5 parts of a silicone antifoamer, 3 parts of a thickener for water-based inks, and 3.5 parts of a blocked isocyanate crosslinking agent for water-based inks; a blue water-based screen printing ink (color-changing material) prepared in the same manner as the above except that use was made of 15 parts of a microcapsular pigment containing a reversibly thermochromic material encapsulated therein (water content, 50 wt %; blue←→colorless; blue below 30° C., colorless at 30° C. and higher); and a pink water-based screen printing ink (color-changing material) prepared in the same manner as the above except that use was made of 15 parts of a microcapsular pigment containing a reversibly thermochromic material encapsulated therein (water content, 50 wt %; pink←→colorless; pink below 30° C., colorless at 30° C. and higher). The inks applied were cured and dried at 100° C. for 3 minutes to form a color-changing porous image pattern layer 61. Thus, a color-change material 1 was obtained.

The color-change material 1 at 24° C. had an appearance bearing a polka dot pattern on a white background. However, upon immersion in warm water having a temperature of about 40° C., the porous layer 3 became translucent and the color-changing porous image pattern layer 61 was decolored and became translucent. As a result, the color-change material 1 came to have the colorful pattern of yellow, blue, and pink colors attributable to the non-color-changing image pattern layer 51. This state was maintained in the warm water. However, upon immersion in water having a temperature of about 20° C., the color-changing porous image pattern layer 61 became colored. As a result, the color-change material 1 came to have a design where circular, triangular, and rectangular patterns coexisted with a polka dot pattern. With respect to color tones, the areas where pink and yellow were superposed on each other assumed red color, those where pink and blue were superposed on each other assumed purple color, and those where yellow and blue were superposed on each other assumed green color.

The color-change material 1 was taken out of the water and allowed to stand at room temperature. As a result, the color-change material 1 for a while had an appearance where those patterns coexisted. Upon drying, however, it came to have an appearance bearing a polka dot pattern on a white background.

As demonstrated above, the color-change material 1 could undergo a variety of changes in appearance according to temperature changes, wetting by a water medium, and drying.

These changes in appearance could be reproduced repeatedly.

Comparative Example 1

A reversibly thermochromic screen printing ink prepared by stirring and homogenizing a mixture of 10 parts of a microcapsular pigment containing a thermochromic color-memory material encapsulated therein (blue←→colorless; blue at 15° C. and lower, colorless at 30° C. and higher), 10 parts of an acrylic ester emulsion (solid content, 50%), 0.2 parts of a silicone antifoamer, 1 part of water, 0.5 parts of ethylene glycol, 0.5 parts of a thickener, and 0.5 parts of an isocyanate crosslinking agent was used to conduct solid printing through a 109-mesh screen stencil on the whole surface of a pink nylon taffeta as a substrate. The ink applied was dried and cured at 130° C. for 5 minutes to form a reversibly thermochromic layer. Thus, a color-change material was obtained.

Upon cooling to 15° C. or lower, the color-change material assumed purple color resulting from the mixing of the pink of the substrate and the blue of the reversibly thermochromic layer. This color tone was maintained in a temperature range below 30° C. Upon heating to 30° C. or higher, the reversibly thermochromic layer became colorless and the pink color of the substrate was perceived. This color tone was maintained in a temperature range above 15° C. However, the number of possible changes in color tone was only two and the variation was limited.

Comparative Example 2

A white screen printing ink prepared by stirring and homogenizing a mixture of 15 parts of a fine silica powder [trade name, Nipsil E-1011; manufactured by Nippon Silica Industrial Co., Ltd.], 45 parts of a polycarbonate urethane emulsion (solid content, 30%), 20 parts of water, 0.2 parts of a silicone antifoamer, 3 parts of ethylene glycol, 3 parts of a water-soluble thickener, and 1.5 parts of a blocked isocyanate crosslinking agent was used to conduct printing through a 180-mesh screen stencil on a pink nylon taffeta as a substrate. The ink applied was dried and cured at 130° C. for 5 minutes to form a white porous layer. Thus, a color-change material was obtained.

The color-change material in a dry state was white. When the color-change material was brought into contact with water, then the porous layer became transparent and the pink color of the substrate was perceived. However, the number of possible changes in color tone was only two and the variation was limited.

The present invention provides: a color-change material having a reversibly thermochromic layer and a porous layer which contains a low-refractive-index pigment and is capable of becoming transparent or translucent upon liquid absorption; and a color-change material having a substrate and formed thereon a color-changing porous layer which contains a reversibly thermochromic material, a low-refractive-index pigment, and a binder and in which the reversibly thermochromic material and the pigment are dispersed in the binder and tenaciously adherent thereto. These color-change materials can effectively exhibit a variety of color changes based on a combination of the function of thermally changing their colors with changing temperature in an ambient-temperature range and the function of changing the degree of transparency between a transparent state and an opaque state upon application of a medium, e.g., water. Since these changes in appearance can be reversibly reproduced repeatedly, the color-change materials can be used in applications in the fields of toys, designs, fashion, ornaments, etc.

What is claimed is:

1. A color-change material comprising a reversibly thermochromic layer comprising a reversibly thermochromic material and a porous layer containing a low-refractive-index pigment;
   wherein said color-change material changes its color in response to heat or water, and said reversibly thermochrornic material contains an electron-donating color-developing organic compound, an electron-accepting compound, and an organic compound medium which reversibly causes color reaction.

2. The color-change material according to claim 1, wherein the reversibly thermochromic layer and the porous layer containing a low-refractive-index pigment are superposed on each other.

3. The color-change material according to claim 2, further comprising a substrate, wherein the reversibly thermochromic layer is formed on the substrate, and the porous layer is formed on the reversibly thermochromic layer.

4. The color-change material according to claim 3, further comprising a reversibly thermochromic image pattern layer formed on the porous layer.

5. The color-change material according to claim 3, wherein the proportion of the reversibly thermochromic material to the low-refractive-index pigment is from 1:9 to 9:1 by weight.

6. The color-change material according to claim 3, wherein the proportion of the sum of the reversibly thermochromic material and the low-refractive-index pigment to the binder is from 2:10 to 10:2 by weight.

7. The color-change material according to claim 2, further comprising a substrate, wherein the porous layer is formed on the substrate, and the reversibly thermochromic layer is formed on the porous layer.

8. The color-change material according to claim 7, further comprising a porous image pattern layer formed on the reversibly thermochromic layer.

9. The color-change material according to claim 1, further comprising a substrate, wherein the reversibly thermochromic layer and the porous layer containing a low-refractive-index pigment are formed side by side on the substrate.

10. The color-change material according to claim 1, further comprising a substrate, wherein the reversibly thermochromic layer is formed on the substrate, and the porous layer is formed on the reversibly thermochromic layer.

11. The color-change material according to claim 10, further comprising a reversibly thermochromic image pattern layer formed on the porous layer.

12. The color-change material according to claim 1, further comprising a substrate, wherein the porous layer is formed on the substrate, and the reversibly thermochromic layer is formed on the porous layer.

13. The color-change material according to claim 12, further comprising a porous image pattern layer formed on the reversibly thermochromic layer.

14. The color-change material according to claim 1, wherein at least one of the reversibly thermochromic layer and the porous layer is an image pattern layer.

15. The color-change material according to claim 1, wherein said reversibly thermochromic material is enclosed by a microcapsule.

16. The color-change material according to claim 1, wherein a particle diameter of said reversibly thermochromic material is in the range of 0.1 to 100 $\mu$m.

17. The color-change material according to claim 16, wherein a particle diameter of said reversibly thermochromic material is in the range of 1 to 50 $\mu$m.

18. The color-change material according to-claim 17, wherein a particle diameter of said reversibly thermochromic material is in the range of 2 to 30 $\mu$m.

19. The color-change material according to claim 1, wherein said reversibly thermochromic layer comprises said reversibly thermochromic material and a vehicle containing a binder, said reversibly thermnochromic material being dispersed into said vehicle.

20. The color-chantge material according to claim 19, wherein said binder is a transparent film-forming resin.

21. The color-change material according to claim 1, wherein said porous layer is a layer containing said low-refractive-index pigment dispersed in a binder resin.

22. The color-change material according to claim 1, wherein a refractive index of said low-refractive-index pigment is in the range of 1.4 to 1.7.

23. The color-change material according to claim 1, wherein a particle diameter of said low-refractive-index pigment is in the range of 0.03 to 10.0 $\mu$m.

* * * * *